(12) United States Patent
Lin et al.

(10) Patent No.: US 12,498,543 B2
(45) Date of Patent: Dec. 16, 2025

(54) OPTICAL IMAGING LENS

(71) Applicant: Genius Electronic Optical (Xiamen) Co., Ltd., Fujian (CN)

(72) Inventors: Maozong Lin, Fujian (CN); Baina Chen, Fujian (CN); Jianpeng Li, Fujian (CN)

(73) Assignee: Genius Electronic Optical (Xiamen) Co., Ltd., Fujian (CN)

( * ) Notice: Subject to any disclaimer, the term of this patent is extended or adjusted under 35 U.S.C. 154(b) by 491 days.

(21) Appl. No.: 18/079,014

(22) Filed: Dec. 12, 2022

(65) Prior Publication Data

US 2024/0094503 A1 Mar. 21, 2024

(30) Foreign Application Priority Data

Sep. 15, 2022 (CN) .......................... 202211120254.8

(51) Int. Cl.
*G02B 9/60* (2006.01)
*G02B 13/18* (2006.01)

(52) U.S. Cl.
CPC ............... *G02B 9/60* (2013.01); *G02B 13/18* (2013.01)

(58) Field of Classification Search
CPC .................................. G02B 9/60; G02B 13/18
See application file for complete search history.

(56) References Cited

PUBLICATIONS

JP H05127082 A (Shibayama Atsushi) machine translation (Year: 1993).*

* cited by examiner

*Primary Examiner* — James A Dudek
(74) *Attorney, Agent, or Firm* — Winston Hsu

(57) ABSTRACT

An optical imaging lens includes an aperture, a front lens group and a rear lens group along an optical axis from an object side to an image side. A first lens element of the front lens group is a lens element in a first order from the object side, and a second lens element is in a second order. The first lens element has positive refracting power, and an optical axis region of the object-side surface of the second lens element is convex, or its periphery region is convex. Lens elements included by the optical imaging lens are only five lens elements. The rear lens group enables the optical imaging lens to form a first focusing state and a second focusing state. EFL is an effective focal length of the first focusing state, and EFLA is an effective focal length of the second focusing state to satisfy EFL/EFLA≥1.200.

20 Claims, 38 Drawing Sheets

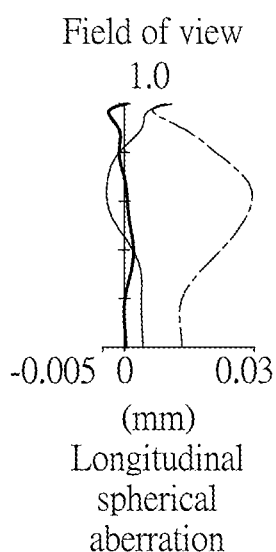
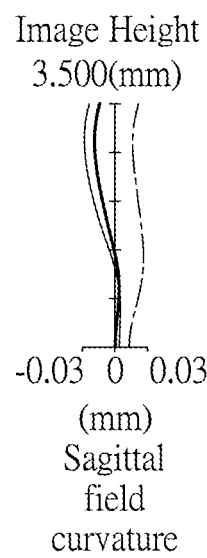
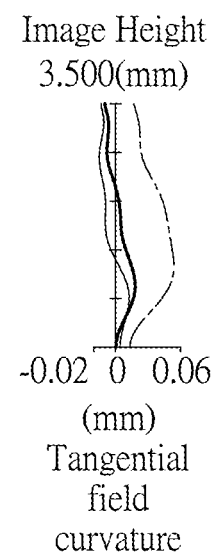
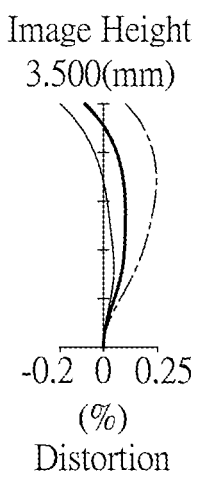
FIG. 7A  FIG. 7B  FIG. 7C  FIG. 7D
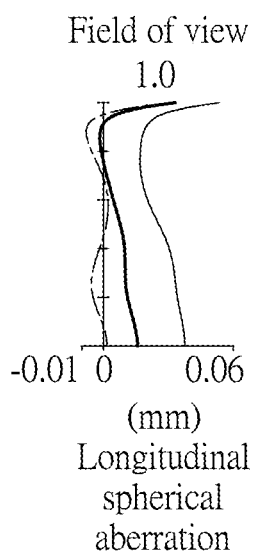
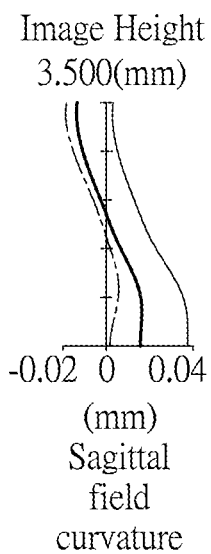
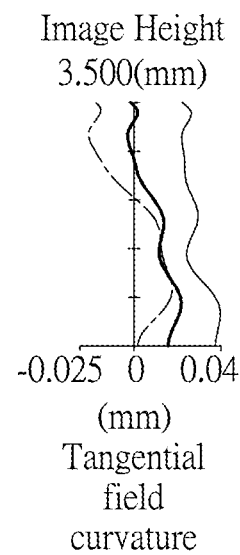
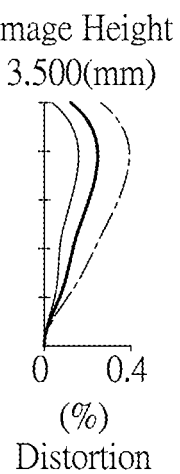
FIG. 7E  FIG. 7F  FIG. 7G  FIG. 7H

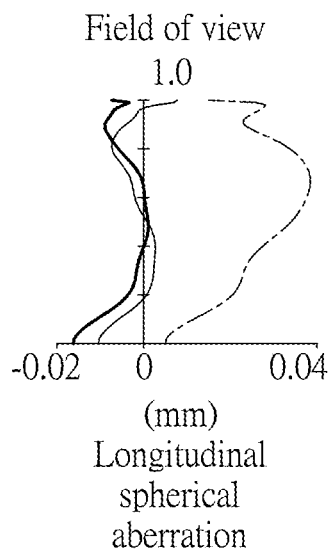 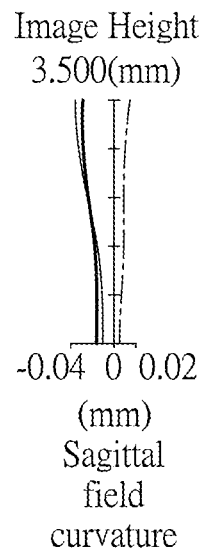 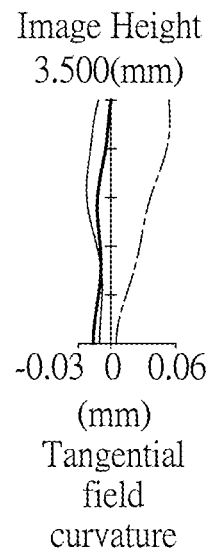 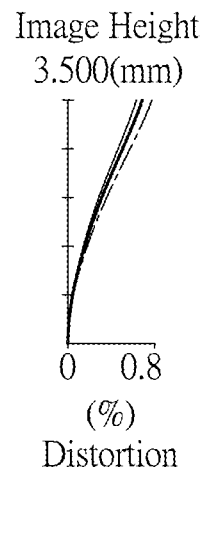
FIG. 9A   FIG. 9B   FIG. 9C   FIG. 9D
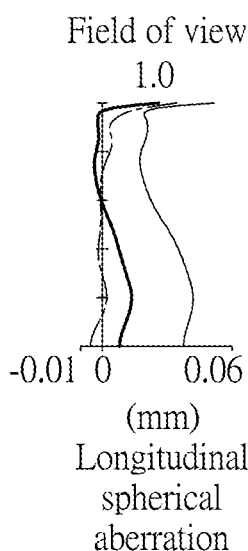 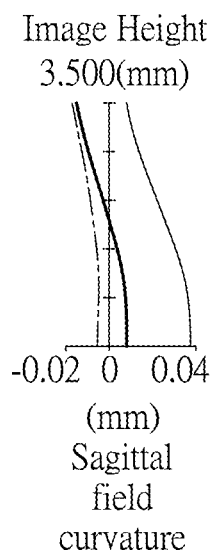 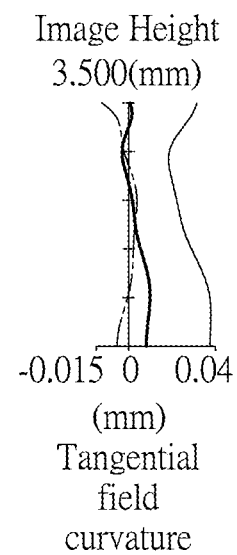 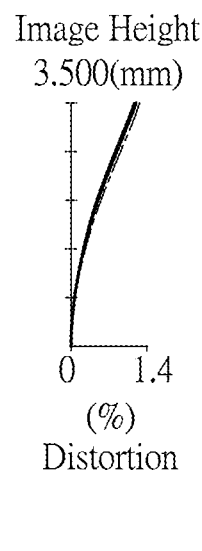
FIG. 9E   FIG. 9F   FIG. 9G   FIG. 9H

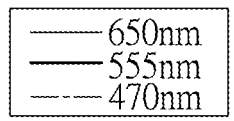
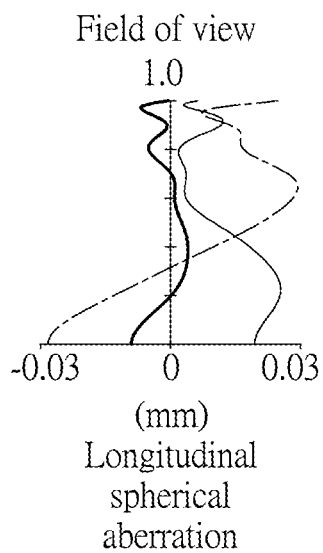
FIG. 11A
Longitudinal spherical aberration
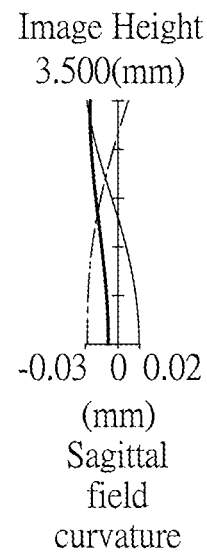
FIG. 11B
Sagittal field curvature
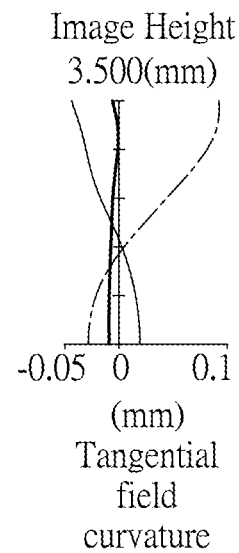
FIG. 11C
Tangential field curvature
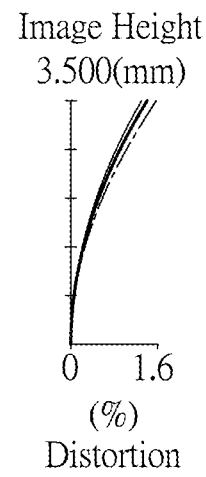
FIG. 11D
Distortion
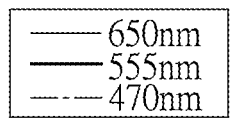
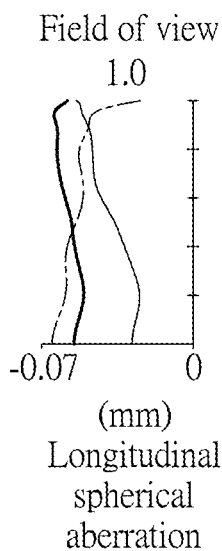
FIG. 11E
Longitudinal spherical aberration
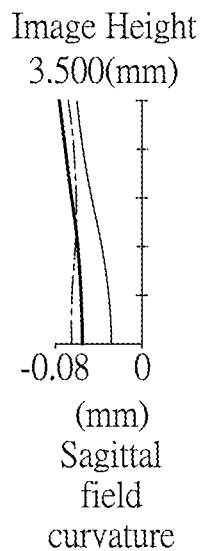
FIG. 11F
Sagittal field curvature
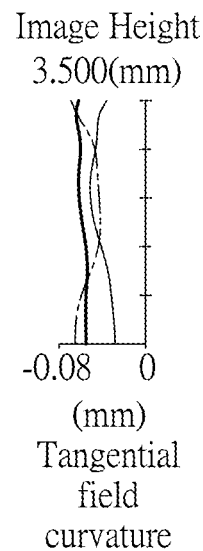
FIG. 11G
Tangential field curvature
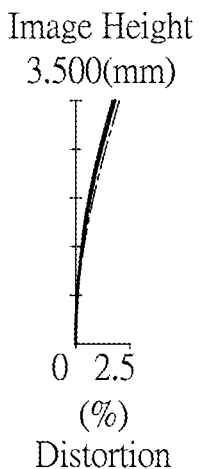
FIG. 11H
Distortion

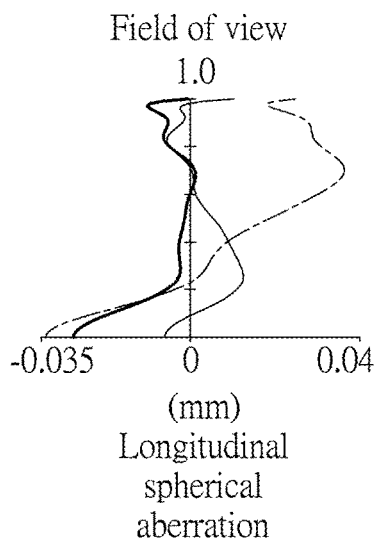 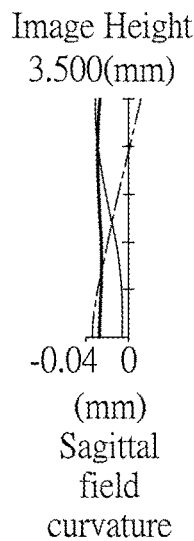 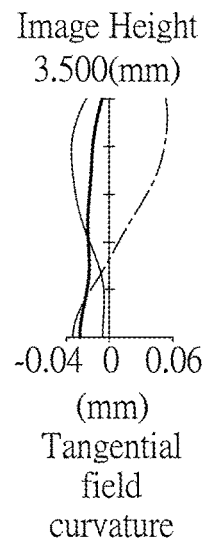 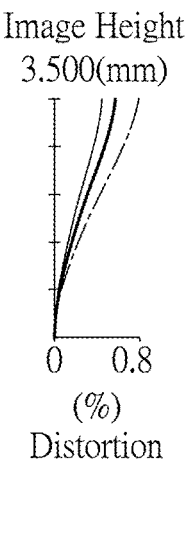
FIG. 13A    FIG. 13B    FIG. 13C    FIG. 13D
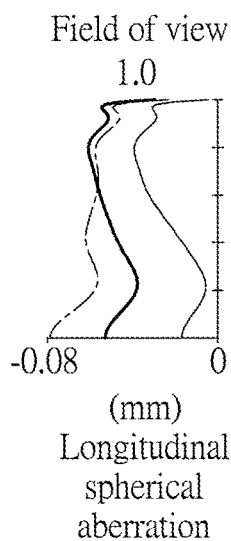 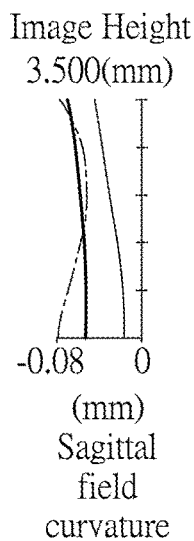 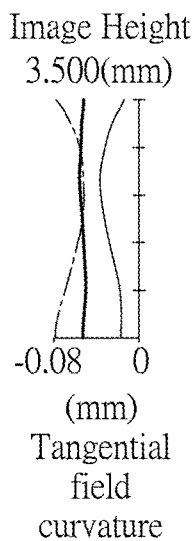 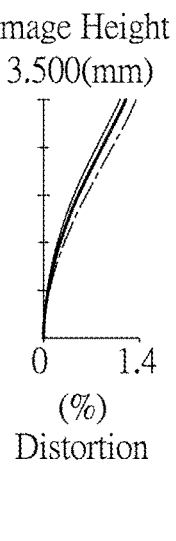
FIG. 13E    FIG. 13F    FIG. 13G    FIG. 13H

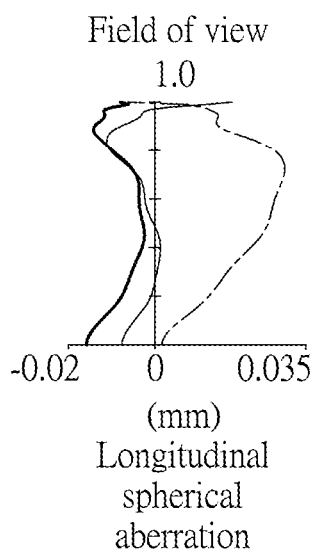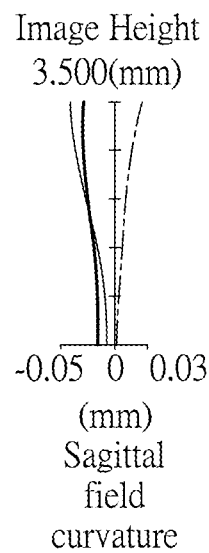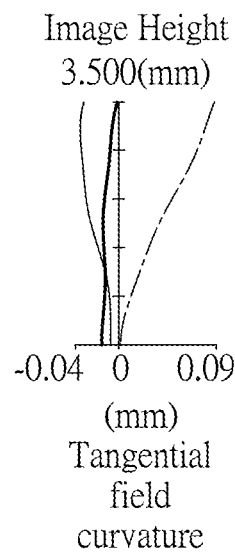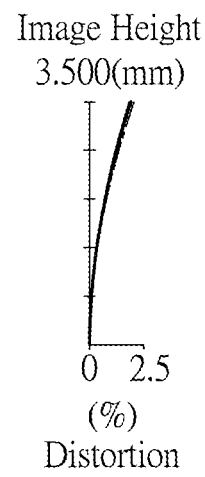
FIG. 15A    FIG. 15B    FIG. 15C    FIG. 15D
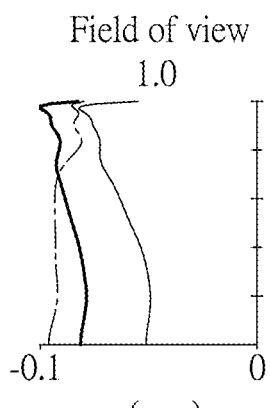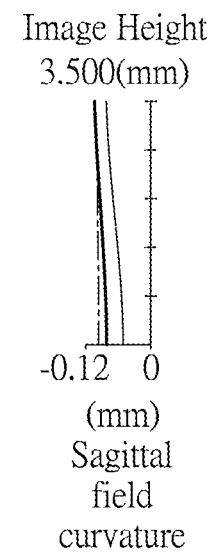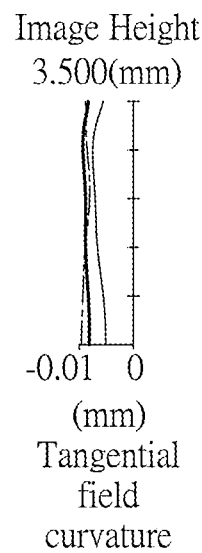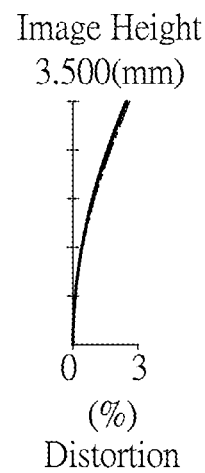
FIG. 15E    FIG. 15F    FIG. 15G    FIG. 15H

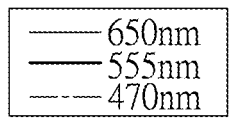
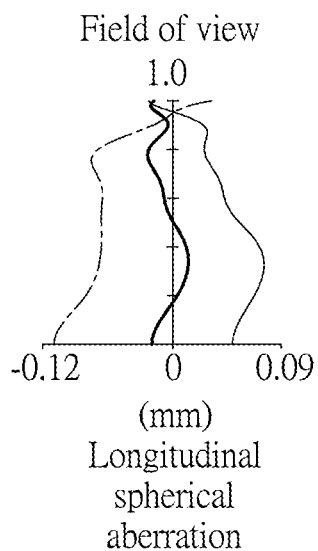
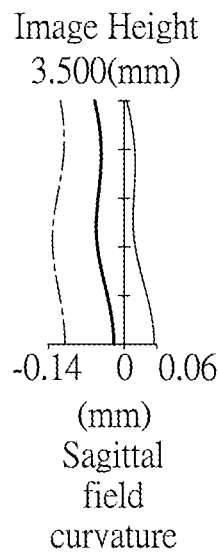
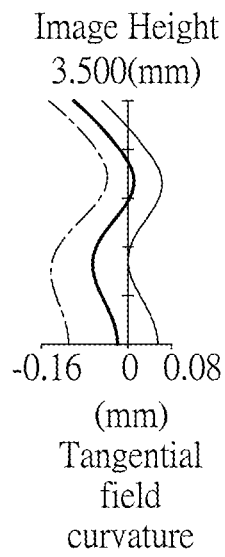
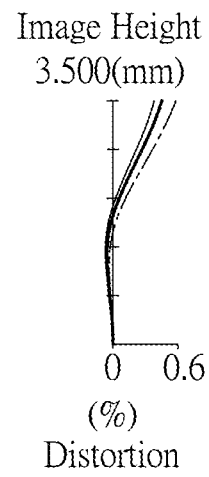
FIG. 19A  FIG. 19B  FIG. 19C  FIG. 19D
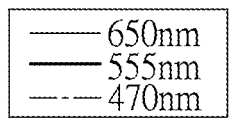
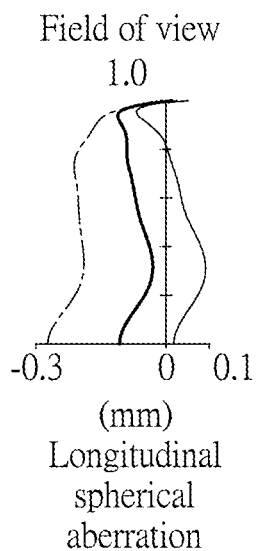
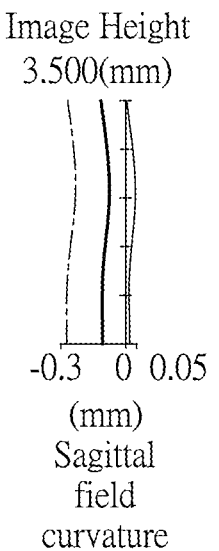
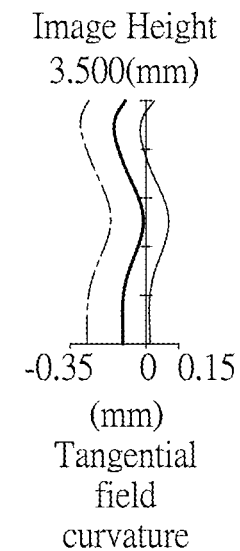
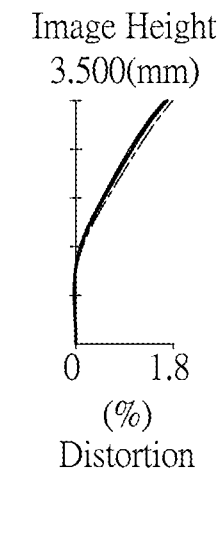
FIG. 19E  FIG. 19F  FIG. 19G  FIG. 19H

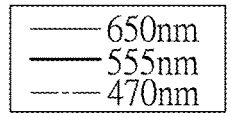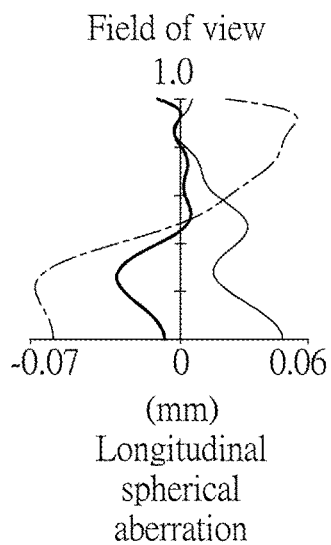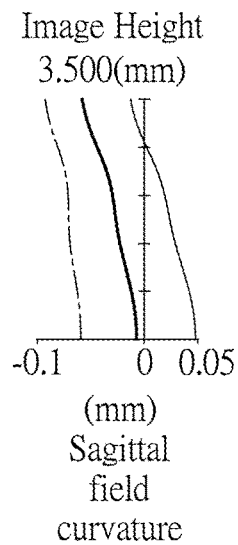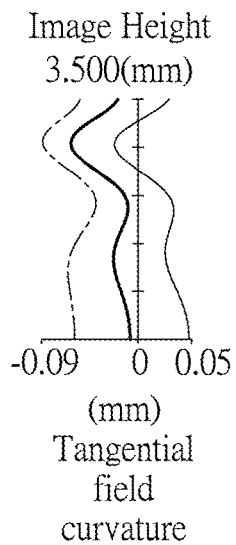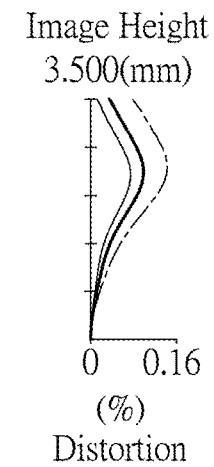
FIG. 21A   FIG. 21B   FIG. 21C   FIG. 21D
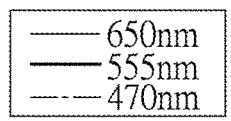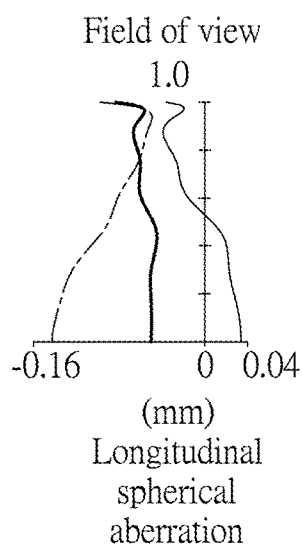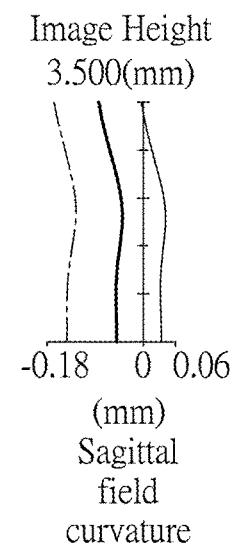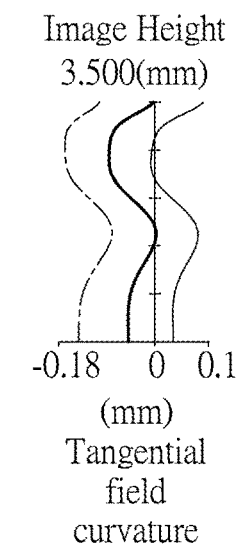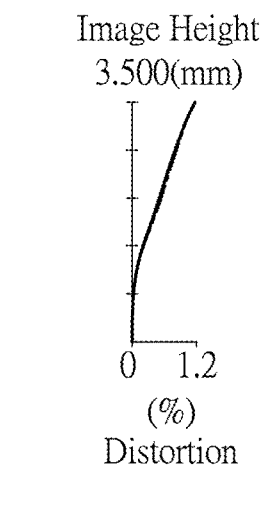
FIG. 21E   FIG. 21F   FIG. 21G   FIG. 21H

| First Embodiment | | | | | | | |
|---|---|---|---|---|---|---|---|
| EFL=9.638mm, EFLA=7.649mm, Fno at first focusing state=3.070, Fno at second focusing state=2.436, HFOV at first focusing state=19.975 degrees, HFOV at second focusing state=20.191 degrees, TTL=12.330mm, ImgH=3.500mm | | | | | | | |
| No. | | Radius of Curvature (mm) | Aperture Stop Distance/ Thickness/ Air Gap at first focusing state (mm) | | Aperture Stop Distance/ Thickness/ Air Gap at second focusing state (mm) | | Refractive Index | Abbe No. | Focal Length (mm) |
| | Object | Infinity | Infinity | | 48.697 | | | | |
| 2 | Ape. Stop | Infinity | 0.522 | | 0.522 | | | | |
| 11 | First Lens element | 8.315 | 1.265 | T1 | 1.265 | T1 | 1.545 | 55.987 | 16.678 |
| 12 | | 90.068 | 0.050 | G12 | 0.050 | G12 | | | |
| 21 | Second Lens element | 4.572 | 0.676 | T2 | 0.676 | T2 | 1.640 | 23.529 | -9.548 |
| 22 | | 2.471 | 0.424 | G23 | 0.424 | G23 | | | |
| 31 | Third Lens element | 12.026 | 1.742 | T3 | 1.742 | T3 | 1.545 | 55.987 | 4.676 |
| 32 | | -3.077 | 0.050 | G34 | 1.587 | G34 | | | |
| 41 | Fourth Lens element | -3.979 | 0.627 | T4 | 0.627 | T4 | 1.640 | 23.529 | -5622.883 |
| 42 | | -4.230 | 0.258 | G45 | 0.258 | G45 | | | |
| 51 | Fifth Lens element | 5.988 | 1.636 | T5 | 1.636 | T5 | 1.545 | 55.987 | -9.806 |
| 52 | | 2.554 | 4.706 | G5F | 3.170 | G5F | | | |
| 3 | Filter | Infinity | 0.210 | | 0.210 | | 1.517 | 64.167 | |
| | | Infinity | 0.685 | | 0.685 | | | | |
| 4 | Image Plane | Infinity | | | | | | | |

FIG. 22

| No. | K | $a_4$ | $a_6$ | $a_8$ | $a_{10}$ |
|---|---|---|---|---|---|
| 11 | -1.368801E+00 | -1.627199E-03 | -1.786205E-03 | 2.221223E-03 | -2.478003E-03 |
| 12 | 0.000000E+00 | 2.151109E-02 | -4.586470E-02 | 4.932936E-02 | -3.078893E-02 |
| 21 | -2.189524E+00 | 6.092201E-03 | -4.095522E-02 | 4.286436E-02 | -2.568534E-02 |
| 22 | 1.844811E-01 | -2.423170E-02 | -5.346149E-03 | 6.837065E-04 | 4.239894E-03 |
| 31 | 0.000000E+00 | -5.170673E-03 | -7.643569E-04 | -3.428877E-03 | 4.857894E-03 |
| 32 | 7.547558E-01 | 1.437260E-03 | 1.371395E-03 | -2.442901E-03 | 2.481305E-03 |
| 41 | -3.922082E+00 | 3.981051E-02 | -1.106629E-02 | -9.726068E-04 | 5.453587E-03 |
| 42 | -1.934925E+01 | 1.637479E-02 | -1.646010E-03 | -7.741423E-03 | 1.137223E-02 |
| 51 | 0.000000E+00 | -1.022479E-02 | -1.033426E-02 | 1.757529E-03 | 4.631566E-03 |
| 52 | -4.002718E+00 | -1.069607E-02 | 4.579645E-04 | 3.165794E-04 | -2.713234E-05 |
| No. | $a_{12}$ | $a_{14}$ | $a_{16}$ | $a_{18}$ | $a_{20}$ |
| 11 | 1.736038E-03 | -7.319080E-04 | 1.781507E-04 | -2.283734E-05 | 1.179882E-06 |
| 12 | 1.137817E-02 | -2.029323E-03 | -6.286573E-05 | 8.449965E-05 | -9.418243E-06 |
| 21 | 9.836794E-03 | -2.330044E-03 | 2.851166E-04 | -7.483796E-06 | -1.068701E-06 |
| 22 | -3.882576E-03 | 1.743102E-03 | -4.787495E-04 | 7.849682E-05 | -5.757816E-06 |
| 31 | -3.980340E-03 | 2.148659E-03 | -7.264878E-04 | 1.341070E-04 | -9.995241E-06 |
| 32 | -1.616971E-03 | 6.745061E-04 | -1.736901E-04 | 2.502767E-05 | -1.547724E-06 |
| 41 | -4.282793E-03 | 1.805827E-03 | -4.426846E-04 | 5.934364E-05 | -3.371585E-06 |
| 42 | -7.861279E-03 | 3.155758E-03 | -7.500016E-04 | 9.821188E-05 | -5.477751E-06 |
| 51 | -4.390292E-03 | 1.915057E-03 | -4.638756E-04 | 6.024151E-05 | -3.283150E-06 |
| 52 | -6.912911E-05 | 3.511426E-05 | -7.789707E-06 | 8.521584E-07 | -3.744361E-08 |

FIG. 23

| Second Embodiment |||||||
|---|---|---|---|---|---|---|
| EFL=13.896mm, EFLA=9.379mm, Fno at first focusing state=3.070, Fno at second focusing state=2.141, HFOV at first focusing state=14.025 degrees, HFOV at second focusing state=13.705 degrees, TTL=15.253mm, ImgH=3.500mm |||||||
| No. | | Radius of Curvature (mm) | Aperture Stop Distance/ Thickness/ Air Gap at first focusing state (mm) | Aperture Stop Distance/ Thickness/ Air Gap at second focusing state (mm) | Refractive Index | Abbe No. | Focal Length (mm) |
| | Object | Infinity | Infinity | 48.697 | | | |
| 2 | Ape. Stop | Infinity | 0.168 | 0.168 | | | |
| 11 | First Lens element | 4.859 | 1.705 T1 | 1.705 T1 | 1.545 | 55.987 | 13.262 |
| 12 | | 12.952 | 0.050 G12 | 0.050 G12 | | | |
| 21 | Second Lens element | 5.530 | 0.508 T2 | 0.508 T2 | 1.640 | 23.529 | -9.484 |
| 22 | | 2.798 | 0.655 G23 | 0.655 G23 | | | |
| 31 | Third Lens element | 14.503 | 2.108 T3 | 2.108 T3 | 1.545 | 55.987 | 6.158 |
| 32 | | -4.150 | 0.783 G34 | 3.200 G34 | | | |
| 41 | Fourth Lens element | -11.615 | 0.799 T4 | 0.799 T4 | 1.573 | 37.666 | 17.995 |
| 42 | | -5.580 | 0.527 G45 | 0.527 G45 | | | |
| 51 | Fifth Lens element | -6.112 | 1.981 T5 | 1.981 T5 | 1.545 | 55.987 | -5.655 |
| 52 | | 6.947 | 5.164 G5F | 2.746 G5F | | | |
| 3 | Filter | Infinity | 0.210 | 0.210 | 1.517 | 64.167 | |
| | | Infinity | 0.765 | 0.765 | | | |
| 4 | Image Plane | Infinity | | | | | |

FIG. 24

| No. | K | $a_4$ | $a_6$ | $a_8$ | $a_{10}$ |
|---|---|---|---|---|---|
| 11 | 1.985380E-01 | -8.335199E-04 | 6.944329E-04 | -8.123412E-04 | 4.850744E-04 |
| 12 | 3.416733E+00 | -5.946422E-05 | 1.538293E-02 | -2.644990E-02 | 2.200608E-02 |
| 21 | -2.183767E+00 | -1.572970E-02 | 1.704610E-02 | -2.809910E-02 | 2.431926E-02 |
| 22 | 3.500469E-01 | -2.419474E-02 | 4.643827E-03 | -8.441220E-03 | 8.569021E-03 |
| 31 | -3.152976E+01 | -1.200775E-03 | -7.443346E-04 | -1.836820E-04 | -4.075393E-05 |
| 32 | 7.903108E-01 | 3.172393E-04 | -2.361622E-04 | 1.438652E-04 | -1.360443E-04 |
| 41 | 4.565906E+00 | 1.624378E-02 | 1.413605E-03 | -2.210231E-03 | 1.844421E-03 |
| 42 | -1.942762E+01 | 1.050905E-02 | 4.251969E-03 | -3.873793E-03 | 2.620307E-03 |
| 51 | -2.428159E+00 | 3.264519E-03 | -1.749514E-03 | -1.353749E-03 | 1.484251E-03 |
| 52 | 5.279529E+00 | -8.903587E-03 | -8.572153E-05 | 7.527069E-05 | -2.569774E-05 |
| No. | $a_{12}$ | $a_{14}$ | $a_{16}$ | $a_{18}$ | $a_{20}$ |
| 11 | -1.781208E-04 | 3.860105E-05 | -4.603181E-06 | 2.484062E-07 | -2.697084E-09 |
| 12 | -1.044626E-02 | 2.929607E-03 | -4.708712E-04 | 3.877995E-05 | -1.180469E-06 |
| 21 | -1.193568E-02 | 3.475411E-03 | -5.883838E-04 | 5.259600E-05 | -1.863020E-06 |
| 22 | -4.718658E-03 | 1.519720E-03 | -2.858734E-04 | 2.878861E-05 | -1.177113E-06 |
| 31 | 2.694965E-04 | -1.826905E-04 | 5.634581E-05 | -8.591683E-06 | 5.285219E-07 |
| 32 | 7.970006E-05 | -2.784219E-05 | 5.608676E-06 | -6.085060E-07 | 2.748191E-08 |
| 41 | -1.011012E-03 | 3.624935E-04 | -8.070151E-05 | 1.009395E-05 | -5.393226E-07 |
| 42 | -1.288084E-03 | 4.302682E-04 | -9.105964E-05 | 1.087945E-05 | -5.520403E-07 |
| 51 | -8.390794E-04 | 2.902112E-04 | -6.158786E-05 | 7.243472E-06 | -3.598797E-07 |
| 52 | 6.879757E-07 | 1.373949E-06 | -4.171704E-07 | 5.198354E-08 | -2.561389E-09 |

FIG. 25

| Third Embodiment | | | | | | | |
|---|---|---|---|---|---|---|---|
| EFL=14.500mm, EFLA=9.521mm, Fno at first focusing state=3.070, Fno at second focusing state=2.125, HFOV at first focusing state=13.379 degrees, HFOV at second focusing state=12.435 degrees, TTL=15.455mm, ImgH=3.500mm | | | | | | | |
| No. | | Radius of Curvature (mm) | Aperture Stop Distance/ Thickness/ Air Gap at first focusing state (mm) | | Aperture Stop Distance/ Thickness/ Air Gap at second focusing state (mm) | | Refractive Index | Abbe No. | Focal Length (mm) |
| | Object | Infinity | Infinity | | 48.246 | | | | |
| 2 | Ape. Stop | Infinity | -0.500 | | -0.500 | | | | |
| 11 | First Lens element | 4.334 | 1.739 | T1 | 1.739 | T1 | 1.545 | 55.987 | 11.760 |
| 12 | | 11.430 | 0.050 | G12 | 0.050 | G12 | | | |
| 21 | Second Lens element | 5.967 | 0.683 | T2 | 0.683 | T2 | 1.640 | 23.529 | -8.852 |
| 22 | | 2.786 | 0.528 | G23 | 0.528 | G23 | | | |
| 31 | Third Lens element | 14.771 | 2.037 | T3 | 2.037 | T3 | 1.545 | 55.987 | 6.847 |
| 32 | | -4.765 | 0.056 | G34 | 3.772 | G34 | | | |
| 41 | Fourth Lens element | -15.994 | 0.799 | T4 | 0.799 | T4 | 1.640 | 23.529 | 19.595 |
| 42 | | -7.196 | 0.170 | G45 | 0.170 | G45 | | | |
| 51 | Fifth Lens element | -49.010 | 1.826 | T5 | 1.826 | T5 | 1.545 | 55.987 | -6.921 |
| 52 | | 4.151 | 5.930 | G5F | 2.214 | G5F | | | |
| 3 | Filter | Infinity | 0.210 | | 0.210 | | 1.517 | 64.167 | |
| | | Infinity | 1.426 | | 1.426 | | | | |
| 4 | Image Plane | Infinity | | | | | | | |

FIG. 26

| No. | K | $a_4$ | $a_6$ | $a_8$ | $a_{10}$ |
|---|---|---|---|---|---|
| 11 | 3.082341E-01 | -1.377095E-04 | 4.865169E-05 | 1.790826E-05 | -1.158191E-04 |
| 12 | 3.407886E+00 | 4.301122E-03 | -3.004518E-04 | 1.037982E-03 | -4.092173E-03 |
| 21 | -1.738013E+00 | -1.104404E-02 | 1.701564E-03 | -7.997744E-04 | -2.011410E-03 |
| 22 | 3.547262E-01 | -2.291779E-02 | 3.548086E-04 | -7.715965E-04 | 8.117516E-04 |
| 31 | -4.070513E+01 | -5.353729E-04 | -1.900223E-03 | 7.323358E-04 | -2.364851E-04 |
| 32 | 8.550228E-01 | 7.776027E-05 | -3.199467E-04 | 7.497491E-05 | 3.166364E-05 |
| 41 | 2.562287E+01 | 1.469270E-02 | 3.929038E-03 | -5.314646E-03 | 3.726088E-03 |
| 42 | -3.075956E+01 | 1.040921E-02 | 2.018149E-02 | -3.101944E-02 | 2.635282E-02 |
| 51 | 3.628456E+01 | -2.361030E-03 | 1.705059E-02 | -3.090729E-02 | 2.726578E-02 |
| 52 | -8.262272E+00 | -1.696508E-03 | -4.067483E-04 | -2.405983E-04 | 2.648616E-04 |
| No. | $a_{12}$ | $a_{14}$ | $a_{16}$ | $a_{18}$ | $a_{20}$ |
| 11 | 8.056093E-05 | -2.771277E-05 | 5.169972E-06 | -5.032772E-07 | 2.003127E-08 |
| 12 | 4.006610E-03 | -1.843768E-03 | 4.494484E-04 | -5.628725E-05 | 2.859975E-06 |
| 21 | 2.790205E-03 | -1.429589E-03 | 3.673138E-04 | -4.749492E-05 | 2.467144E-06 |
| 22 | -3.535486E-04 | 1.007188E-04 | -2.432006E-05 | 4.201399E-06 | -3.058817E-07 |
| 31 | -1.285782E-04 | 1.683937E-04 | -6.786733E-05 | 1.227127E-05 | -8.222058E-07 |
| 32 | -7.175575E-05 | 4.434485E-05 | -1.376101E-05 | 2.161255E-06 | -1.370430E-07 |
| 41 | -1.655312E-03 | 4.882766E-04 | -9.378924E-05 | 1.072888E-05 | -5.542615E-07 |
| 42 | -1.422779E-02 | 4.987558E-03 | -1.097365E-03 | 1.371764E-04 | -7.383526E-06 |
| 51 | -1.485204E-02 | 5.172526E-03 | -1.120220E-03 | 1.369214E-04 | -7.168608E-06 |
| 52 | -1.144876E-04 | 2.844143E-05 | -4.253601E-06 | 3.584779E-07 | -1.313856E-08 |

FIG. 27

| Fourth Embodiment |||||||
|---|---|---|---|---|---|---|
| EFL=13.846mm, EFLA=9.271mm, Fno at first focusing state=3.070, Fno at second focusing state=2.088, HFOV at first focusing state=14.073 degrees, HFOV at second focusing state=13.611 degrees, TTL=14.999mm, ImgH=3.500mm |||||||

| No. | | Radius of Curvature (mm) | Aperture Stop Distance/ Thickness/ Air Gap at first focusing state (mm) | | Aperture Stop Distance/ Thickness/ Air Gap at second focusing state (mm) | | Refractive Index | Abbe No. | Focal Length (mm) |
|---|---|---|---|---|---|---|---|---|---|
| | Object | Infinity | Infinity | | 48.241 | | | | |
| 2 | Ape. Stop | Infinity | -0.505 | | -0.505 | | | | |
| 11 | First Lens element | 5.187 | 1.824 | T1 | 1.824 | T1 | 1.545 | 55.987 | 12.410 |
| 12 | | 19.335 | 0.050 | G12 | 0.050 | G12 | | | |
| 21 | Second Lens element | 5.913 | 0.819 | T2 | 0.819 | T2 | 1.640 | 23.529 | -9.085 |
| 22 | | 2.783 | 0.744 | G23 | 0.744 | G23 | | | |
| 31 | Third Lens element | 13.136 | 2.087 | T3 | 2.087 | T3 | 1.545 | 55.987 | 6.005 |
| 32 | | -4.127 | 0.995 | G34 | 3.337 | G34 | | | |
| 41 | Fourth Lens element | -8.882 | 0.888 | T4 | 0.888 | T4 | 1.640 | 23.529 | 20.436 |
| 42 | | -5.513 | 0.609 | G45 | 0.609 | G45 | | | |
| 51 | Fifth Lens element | -5.991 | 0.956 | T5 | 0.956 | T5 | 1.545 | 55.987 | -5.882 |
| 52 | | 7.319 | 5.113 | G5F | 2.770 | G5F | | | |
| 3 | Filter | Infinity | 0.210 | | 0.210 | | 1.517 | 64.167 | |
| | | Infinity | 0.705 | | 0.705 | | | | |
| 4 | Image Plane | Infinity | | | | | | | |

FIG. 28

| No. | K | $a_4$ | $a_6$ | $a_8$ | $a_{10}$ |
|---|---|---|---|---|---|
| 11 | 5.737279E-01 | -2.694128E-04 | 4.887895E-04 | -4.263953E-04 | 1.701820E-04 |
| 12 | 2.589582E+00 | -6.713587E-03 | 2.562838E-02 | -3.332644E-02 | 2.312170E-02 |
| 21 | -2.267206E+00 | -1.944635E-02 | 2.658657E-02 | -3.417833E-02 | 2.424080E-02 |
| 22 | 3.560255E-01 | -2.380688E-02 | 6.626494E-03 | -8.749316E-03 | 6.630997E-03 |
| 31 | -4.536291E+01 | -2.262918E-03 | -1.577748E-04 | 4.065043E-05 | -9.884688E-04 |
| 32 | 8.420369E-01 | 1.038198E-04 | -4.287583E-04 | 4.809523E-04 | -4.636212E-04 |
| 41 | -5.757547E+00 | 1.875290E-02 | -4.532358E-04 | -4.723117E-04 | 4.111776E-04 |
| 42 | -2.585589E+01 | 1.033585E-02 | 5.483795E-03 | -3.832027E-03 | 2.179127E-03 |
| 51 | 3.310540E-01 | 1.476364E-03 | -3.325966E-03 | -8.490758E-04 | 1.869036E-03 |
| 52 | -2.745294E+01 | -6.328529E-03 | -1.324553E-03 | 6.908846E-04 | -1.627160E-04 |
| No. | $a_{12}$ | $a_{14}$ | $a_{16}$ | $a_{18}$ | $a_{20}$ |
| 11 | -3.243454E-05 | 8.060462E-07 | 7.785048E-07 | -1.267424E-07 | 6.254287E-09 |
| 12 | -9.457343E-03 | 2.357298E-03 | -3.510843E-04 | 2.861745E-05 | -9.778270E-07 |
| 21 | -1.014540E-02 | 2.593755E-03 | -3.979795E-04 | 3.362411E-05 | -1.200278E-06 |
| 22 | -2.750825E-03 | 5.896171E-04 | -4.208216E-05 | -5.492682E-06 | 8.518318E-07 |
| 31 | 1.155158E-03 | -6.162923E-04 | 1.772928E-04 | -2.670040E-05 | 1.658679E-06 |
| 32 | 2.740178E-04 | -9.938833E-05 | 2.157864E-05 | -2.579828E-06 | 1.305167E-07 |
| 41 | -2.056821E-04 | 6.933428E-05 | -1.454064E-05 | 1.709489E-06 | -8.506759E-08 |
| 42 | -9.167406E-04 | 2.561004E-04 | -4.029604E-05 | 2.510592E-06 | 5.025352E-08 |
| 51 | -1.266196E-03 | 4.606789E-04 | -9.269848E-05 | 9.116356E-06 | -2.843548E-07 |
| 52 | -4.868541E-07 | 1.092582E-05 | -2.882671E-06 | 3.250702E-07 | -1.408433E-08 |

FIG. 29

| Fifth Embodiment | | | | | | | |
|---|---|---|---|---|---|---|---|
| EFL=14.407mm, EFLA=9.421mm, Fno at first focusing state=3.074, Fno at second focusing state=2.093, HFOV at first focusing state=13.389 degrees, HFOV at second focusing state=12.657 degrees, TTL=14.911mm, ImgH=3.500mm | | | | | | | |
| No. | | Radius of Curvature (mm) | Aperture Stop Distance/ Thickness/ Air Gap at first focusing state (mm) | | Aperture Stop Distance/ Thickness/ Air Gap at second focusing state (mm) | | Refractive Index | Abbe No. | Focal Length (mm) |
| | Object | Infinity | Infinity | | 48.697 | | | | |
| 2 | Ape. Stop | Infinity | 0.062 | | 0.062 | | | | |
| 11 | First Lens element | 4.719 | 2.422 | T1 | 2.422 | T1 | 1.545 | 55.987 | 8.196 |
| 12 | | -70.368 | 0.050 | G12 | 0.050 | G12 | | | |
| 21 | Second Lens element | 11.731 | 0.582 | T2 | 0.582 | T2 | 1.640 | 23.529 | -5.803 |
| 22 | | 2.779 | 0.477 | G23 | 0.477 | G23 | | | |
| 31 | Third Lens element | 12.424 | 1.523 | T3 | 1.523 | T3 | 1.573 | 37.666 | 6.003 |
| 32 | | -4.506 | 0.484 | G34 | 3.294 | G34 | | | |
| 41 | Fourth Lens element | -13.112 | 0.630 | T4 | 0.630 | T4 | 1.640 | 23.529 | 34.278 |
| 42 | | -8.381 | 0.548 | G45 | 0.548 | G45 | | | |
| 51 | Fifth Lens element | -12.710 | 1.749 | T5 | 1.749 | T5 | 1.545 | 55.987 | -7.061 |
| 52 | | 5.800 | 5.378 | G5F | 2.568 | G5F | | | |
| 3 | Filter | Infinity | 0.210 | | 0.210 | | 1.517 | 64.167 | |
| | | Infinity | 0.860 | | 0.860 | | | | |
| 4 | Image Plane | Infinity | | | | | | | |

FIG. 30

| No. | K | $a_4$ | $a_6$ | $a_8$ | $a_{10}$ |
|---|---|---|---|---|---|
| 11 | 2.000763E-01 | -8.638573E-04 | 3.828325E-04 | -4.459986E-04 | 2.547062E-04 |
| 12 | 0.000000E+00 | 3.022454E-03 | 9.008452E-03 | -1.917846E-02 | 1.842551E-02 |
| 21 | -2.649673E+00 | -1.731170E-02 | 1.300252E-02 | -2.292927E-02 | 2.338884E-02 |
| 22 | 3.795702E-01 | -2.595799E-02 | 4.556067E-03 | -9.305737E-03 | 1.164480E-02 |
| 31 | -1.728435E+01 | 1.583825E-03 | -2.210131E-03 | 2.478946E-05 | -2.947394E-04 |
| 32 | 1.127970E+00 | 2.809613E-04 | -9.180312E-05 | -7.500048E-04 | 7.881626E-04 |
| 41 | -6.180586E+00 | 2.025362E-02 | -1.566785E-03 | 4.873380E-04 | -1.208711E-04 |
| 42 | -4.669719E+01 | 1.644175E-02 | 6.101815E-04 | -1.482256E-03 | 1.982448E-03 |
| 51 | -1.718480E+00 | -1.132266E-04 | -2.449447E-03 | -1.068315E-03 | 2.472151E-03 |
| 52 | -7.537367E+00 | -4.460883E-03 | -5.542558E-04 | 4.781521E-04 | -1.777675E-04 |
| No. | $a_{12}$ | $a_{14}$ | $a_{16}$ | $a_{18}$ | $a_{20}$ |
| 11 | -8.986843E-05 | 1.879535E-05 | -2.210850E-06 | 1.260774E-07 | -2.204472E-09 |
| 12 | -9.945054E-03 | 3.125008E-03 | -5.578388E-04 | 5.119950E-05 | -1.790842E-06 |
| 21 | -1.342998E-02 | 4.513815E-03 | -8.754225E-04 | 8.997592E-05 | -3.747370E-06 |
| 22 | -7.523883E-03 | 2.719897E-03 | -5.464535E-04 | 5.523188E-05 | -2.039641E-06 |
| 31 | 1.003560E-03 | -8.064085E-04 | 2.970903E-04 | -5.291373E-05 | 3.695597E-06 |
| 32 | -4.635068E-04 | 1.619013E-04 | -3.419122E-05 | 4.041528E-06 | -2.094643E-07 |
| 41 | -2.555278E-05 | 4.898859E-05 | -2.120258E-05 | 4.078602E-06 | -2.969244E-07 |
| 42 | -1.584330E-03 | 7.790249E-04 | -2.258071E-04 | 3.521124E-05 | -2.249781E-06 |
| 51 | -1.983715E-03 | 8.942116E-04 | -2.352976E-04 | 3.343902E-05 | -1.963799E-06 |
| 52 | 3.462152E-05 | -2.091798E-06 | -4.775540E-07 | 9.761863E-08 | -5.318536E-09 |

FIG. 31

| No. | | Radius of Curvature (mm) | Aperture Stop Distance/ Thickness/ Air Gap at first focusing state (mm) | | Aperture Stop Distance/ Thickness/ Air Gap at second focusing state (mm) | | Refractive Index | Abbe No. | Focal Length (mm) |
|---|---|---|---|---|---|---|---|---|---|
| Sixth Embodiment | | | | | | | | | |
| EFL=14.314mm, EFLA=9.794mm, Fno at first focusing state=3.070, Fno at second focusing state=2.206, HFOV at first focusing state=13.597 degrees, HFOV at second focusing state=13.179 degrees, TTL=15.041mm, ImgH=3.500mm | | | | | | | | | |
| | Object | Infinity | Infinity | | 48.697 | | | | |
| 2 | Ape. Stop | Infinity | 0.189 | | 0.189 | | | | |
| 11 | First Lens element | 5.295 | 1.948 | T1 | 1.948 | T1 | 1.545 | 55.987 | 13.132 |
| 12 | | 17.586 | 0.050 | G12 | 0.050 | G12 | | | |
| 21 | Second Lens element | 5.675 | 0.300 | T2 | 0.300 | T2 | 1.640 | 23.529 | -9.059 |
| 22 | | 2.818 | 0.593 | G23 | 0.593 | G23 | | | |
| 31 | Third Lens element | 16.423 | 1.846 | T3 | 1.846 | T3 | 1.545 | 55.987 | 6.153 |
| 32 | | -4.058 | 0.972 | G34 | 3.362 | G34 | | | |
| 41 | Fourth Lens element | -6.507 | 0.396 | T4 | 0.396 | T4 | 1.640 | 23.529 | 26.525 |
| 42 | | -4.826 | 1.058 | G45 | 1.058 | G45 | | | |
| 51 | Fifth Lens element | -7.455 | 0.748 | T5 | 0.748 | T5 | 1.545 | 55.987 | -6.635 |
| 52 | | 7.304 | 5.311 | G5F | 2.921 | G5F | | | |
| 3 | Filter | Infinity | 0.210 | | 0.210 | | 1.517 | 64.167 | |
| | | Infinity | 1.609 | | 1.609 | | | | |
| 4 | Image Plane | Infinity | | | | | | | |

FIG. 32

| No. | K | $a_4$ | $a_6$ | $a_8$ | $a_{10}$ |
|---|---|---|---|---|---|
| 11 | -2.485456E-01 | -2.139346E-03 | 1.075010E-03 | -1.065385E-03 | 5.660029E-04 |
| 12 | 9.558062E-01 | -1.041499E-03 | 2.586363E-02 | -4.587963E-02 | 3.891967E-02 |
| 21 | -2.433407E+00 | -1.673209E-02 | 3.028515E-02 | -5.807002E-02 | 5.235027E-02 |
| 22 | 3.497839E-01 | -2.085210E-02 | 7.400977E-03 | -2.284950E-02 | 2.366276E-02 |
| 31 | 1.547939E+00 | 1.730328E-03 | -1.234731E-03 | -9.006892E-04 | 3.980843E-04 |
| 32 | 7.953328E-01 | 7.769770E-04 | -4.024882E-04 | 2.987187E-04 | -2.598348E-04 |
| 41 | -2.021162E+01 | 2.129924E-02 | -9.632154E-04 | 8.528947E-04 | -5.403435E-04 |
| 42 | -2.441892E+01 | 8.924232E-03 | 7.462941E-03 | -3.325476E-03 | 8.100803E-04 |
| 51 | 2.359254E+00 | 3.797482E-03 | -1.084029E-02 | 7.489840E-03 | -4.256396E-03 |
| 52 | -1.756044E+01 | -2.103075E-03 | -6.163839E-03 | 4.704590E-03 | -2.454909E-03 |
| No. | $a_{12}$ | $a_{14}$ | $a_{16}$ | $a_{18}$ | $a_{20}$ |
| 11 | -1.867636E-04 | 3.638723E-05 | -3.912912E-06 | 1.936238E-07 | -2.194417E-09 |
| 12 | -1.864241E-02 | 5.296214E-03 | -8.857162E-04 | 8.080878E-05 | -3.117683E-06 |
| 21 | -2.599330E-02 | 7.606934E-03 | -1.310596E-03 | 1.233686E-04 | -4.914970E-06 |
| 22 | -1.255561E-02 | 3.846294E-03 | -6.883233E-04 | 6.692894E-05 | -2.743319E-06 |
| 31 | 1.849002E-04 | -1.706622E-04 | 4.930372E-05 | -6.390482E-06 | 3.070525E-07 |
| 32 | 1.355300E-04 | -4.204189E-05 | 7.588242E-06 | -7.418877E-07 | 2.982127E-08 |
| 41 | 1.435919E-04 | -7.110223E-06 | -3.821562E-06 | 6.807617E-07 | -3.013073E-08 |
| 42 | 4.722904E-06 | -1.075885E-04 | 4.563002E-05 | -8.551969E-06 | 6.172843E-07 |
| 51 | 1.679553E-03 | -4.502337E-04 | 7.698171E-05 | -7.557703E-06 | 3.115895E-07 |
| 52 | 8.779528E-04 | -2.105246E-04 | 3.225870E-05 | -2.850580E-06 | 1.103749E-07 |

FIG. 33

| Seventh Embodiment |||||||||
|---|---|---|---|---|---|---|---|---|
| EFL=15.792mm, EFLA=10.185mm, Fno at first focusing state=3.476, Fno at second focusing state=2.242, HFOV at first focusing state=12.425 degrees, HFOV at second focusing state=12.019 degrees, TTL=16.291mm, ImgH=3.500mm |||||||||
| No. | | Radius of Curvature (mm) | Aperture Stop Distance/ Thickness/ Air Gap at first focusing state (mm) | | Aperture Stop Distance/ Thickness/ Air Gap at second focusing state (mm) | | Refractive Index | Abbe No. | Focal Length (mm) |
| | Object | Infinity | Infinity | | 48.697 | | | | |
| 2 | Ape. Stop | Infinity | 0.236 | | 0.236 | | | | |
| 11 | First Lens element | 4.670 | 2.118 | T1 | 2.118 | T1 | 1.535 | 55.635 | 14.343 |
| 12 | | 10.004 | 0.139 | G12 | 0.139 | G12 | | | |
| 21 | Second Lens element | 5.265 | 0.520 | T2 | 0.520 | T2 | 1.640 | 23.529 | -10.174 |
| 22 | | 2.807 | 0.375 | G23 | 0.375 | G23 | | | |
| 31 | Third Lens element | 10.631 | 2.741 | T3 | 2.741 | T3 | 1.567 | 37.490 | 6.194 |
| 32 | | -4.787 | 1.100 | G34 | 3.457 | G34 | | | |
| 41 | Fourth Lens element | -17.302 | 0.846 | T4 | 0.846 | T4 | 1.661 | 20.373 | -783.278 |
| 42 | | -18.244 | 0.567 | G45 | 0.567 | G45 | | | |
| 51 | Fifth Lens element | -5.383 | 1.320 | T5 | 1.320 | T5 | 1.535 | 55.635 | -8.402 |
| 52 | | 30.019 | 5.206 | G5F | 2.849 | G5F | | | |
| 3 | Filter | Infinity | 0.210 | | 0.210 | | 1.517 | 64.167 | |
| | | Infinity | 1.149 | | 1.149 | | | | |
| 4 | Image Plane | Infinity | | | | | | | |

FIG. 34

| No. | K | $a_4$ | $a_6$ | $a_8$ | $a_{10}$ |
|---|---|---|---|---|---|
| 11 | 4.571976E-01 | -5.195476E-04 | 8.756705E-04 | -6.817097E-04 | 2.199987E-04 |
| 12 | 1.851812E-01 | -5.783179E-03 | 3.415341E-02 | -5.718392E-02 | 4.720577E-02 |
| 21 | -3.987483E+00 | -1.739218E-02 | 3.101778E-02 | -5.786194E-02 | 5.119647E-02 |
| 22 | 3.753806E-01 | -1.727598E-02 | -1.078064E-03 | -9.603809E-03 | 1.249638E-02 |
| 31 | -4.450396E+00 | 3.459358E-03 | -4.649146E-03 | 3.708242E-03 | -3.388794E-03 |
| 32 | 8.118064E-01 | 2.313084E-03 | -4.566257E-03 | 5.425867E-03 | -4.114562E-03 |
| 41 | -5.853218E+01 | 2.207493E-02 | -1.067263E-02 | 1.445970E-02 | -1.201058E-02 |
| 42 | -2.418916E+02 | 2.114716E-02 | -2.962414E-03 | 5.442865E-03 | -3.617632E-03 |
| 51 | 8.563048E-01 | -1.658441E-03 | -2.196840E-03 | -9.853073E-04 | 2.525405E-03 |
| 52 | -6.791295E+01 | -8.756009E-03 | -1.777537E-04 | 1.788852E-04 | 8.008407E-05 |
| No. | $a_{12}$ | $a_{14}$ | $a_{16}$ | $a_{18}$ | $a_{20}$ |
| 11 | -3.452537E-06 | -1.814038E-05 | 5.256115E-06 | -6.233683E-07 | 2.792771E-08 |
| 12 | -2.214606E-02 | 6.198724E-03 | -1.027393E-03 | 9.327975E-05 | -3.588295E-06 |
| 21 | -2.515454E-02 | 7.316496E-03 | -1.257941E-03 | 1.185407E-04 | -4.739745E-06 |
| 22 | -6.921581E-03 | 2.052095E-03 | -3.271807E-04 | 2.452109E-05 | -5.356450E-07 |
| 31 | 2.421396E-03 | -1.060637E-03 | 2.735212E-04 | -3.782038E-05 | 2.139767E-06 |
| 32 | 1.970173E-03 | -5.943423E-04 | 1.097561E-04 | -1.135311E-05 | 5.043378E-07 |
| 41 | 6.348896E-03 | -2.163304E-03 | 4.647693E-04 | -5.764708E-05 | 3.148392E-06 |
| 42 | 1.834966E-03 | -8.739245E-04 | 3.405613E-04 | -7.553465E-05 | 6.730665E-06 |
| 51 | -1.185439E-03 | -1.128130E-04 | 2.717587E-04 | -8.481906E-05 | 8.781588E-06 |
| 52 | -1.037247E-04 | 4.066025E-05 | -8.180999E-06 | 8.505317E-07 | -3.657599E-08 |

FIG. 35

| Eighth Embodiment ||||||||
|---|---|---|---|---|---|---|---|
| EFL=14.395mm, EFLA=9.785mm, Fno at first focusing state=3.423, Fno at second focusing state=2.327, HFOV at first focusing state=13.652 degrees, HFOV at second focusing state=13.225 degrees, TTL=15.167mm, ImgH=3.500mm ||||||||
| No. | | Radius of Curvature (mm) | Aperture Stop Distance/ Thickness/ Air Gap at first focusing state (mm) | | Aperture Stop Distance/ Thickness/ Air Gap at second focusing state (mm) | | Refractive Index | Abbe No. | Focal Length (mm) |
| | Object | Infinity | Infinity | | 48.697 | | | | |
| 2 | Ape. Stop | Infinity | -0.002 | | -0.002 | | | | |
| 11 | First Lens element | 4.688 | 1.835 | T1 | 1.835 | T1 | 1.545 | 55.987 | 14.048 |
| 12 | | 10.380 | 0.062 | G12 | 0.062 | G12 | | | |
| 21 | Second Lens element | 5.328 | 0.605 | T2 | 0.605 | T2 | 1.608 | 26.904 | -10.989 |
| 22 | | 2.845 | 0.747 | G23 | 0.747 | G23 | | | |
| 31 | Third Lens element | 16.115 | 1.816 | T3 | 1.816 | T3 | 1.523 | 54.517 | 6.359 |
| 32 | | -4.048 | 1.096 | G34 | 3.458 | G34 | | | |
| 41 | Fourth Lens element | -9.403 | 1.135 | T4 | 1.135 | T4 | 1.567 | 37.490 | 25.275 |
| 42 | | -5.939 | 0.504 | G45 | 0.504 | G45 | | | |
| 51 | Fifth Lens element | -5.014 | 0.799 | T5 | 0.799 | T5 | 1.535 | 55.690 | -6.731 |
| 52 | | 13.680 | 5.208 | G5F | 2.846 | G5F | | | |
| 3 | Filter | Infinity | 0.210 | | 0.210 | | 1.517 | 64.167 | |
| | | Infinity | 1.149 | | 1.149 | | | | |
| 4 | Image Plane | Infinity | | | | | | | |

FIG. 36

| No. | K | $a_4$ | $a_6$ | $a_8$ | $a_{10}$ |
|---|---|---|---|---|---|
| 11 | 4.065448E-01 | -7.294114E-04 | 9.498796E-04 | -6.882290E-04 | 2.202567E-04 |
| 12 | -7.647224E+01 | -8.493706E-03 | 3.449971E-02 | -5.716284E-02 | 4.720943E-02 |
| 21 | -1.059442E+01 | -1.946983E-02 | 3.061881E-02 | -5.782072E-02 | 5.121498E-02 |
| 22 | 3.795745E-01 | -1.620473E-02 | -1.103297E-03 | -9.755224E-03 | 1.246721E-02 |
| 31 | -7.991258E+01 | 3.265724E-03 | -4.504520E-03 | 3.642703E-03 | -3.422867E-03 |
| 32 | 8.236653E-01 | 2.399671E-03 | -4.653698E-03 | 5.460357E-03 | -4.117263E-03 |
| 41 | 4.234546E+00 | 2.100160E-02 | -1.101986E-02 | 1.445776E-02 | -1.199258E-02 |
| 42 | -2.034945E+01 | 1.452537E-02 | -4.587229E-03 | 5.280757E-03 | -3.625347E-03 |
| 51 | 2.362126E+00 | -4.268183E-03 | -2.358485E-03 | -1.437756E-03 | 2.480277E-03 |
| 52 | -1.289434E+02 | -1.158698E-02 | -2.410084E-04 | 2.192589E-04 | 8.287033E-05 |
| No. | $a_{12}$ | $a_{14}$ | $a_{16}$ | $a_{18}$ | $a_{20}$ |
| 11 | -3.230212E-06 | -1.810331E-05 | 5.257393E-06 | -6.247834E-07 | 2.799125E-08 |
| 12 | -2.214304E-02 | 6.199535E-03 | -1.027326E-03 | 9.327082E-05 | -3.575978E-06 |
| 21 | -2.515160E-02 | 7.317045E-03 | -1.257744E-03 | 1.185886E-04 | -4.752059E-06 |
| 22 | -6.920134E-03 | 2.053824E-03 | -3.269199E-04 | 2.445590E-05 | -5.586599E-07 |
| 31 | 2.412873E-03 | -1.061887E-03 | 2.735386E-04 | -3.776234E-05 | 2.143887E-06 |
| 32 | 1.967497E-03 | -5.946679E-04 | 1.098563E-04 | -1.131348E-05 | 4.964989E-07 |
| 41 | 6.344817E-03 | -2.164085E-03 | 4.650216E-04 | -5.751667E-05 | 3.131964E-06 |
| 42 | 1.824413E-03 | -8.783866E-04 | 3.393247E-04 | -7.562978E-05 | 6.901494E-06 |
| 51 | -1.182171E-03 | -1.110446E-04 | 2.721724E-04 | -8.494857E-05 | 8.651994E-06 |
| 52 | -1.035849E-04 | 4.059656E-05 | -8.185385E-06 | 8.533135E-07 | -3.633313E-08 |

FIG. 37

| Embodiment | 1st | 2nd | 3rd | 4th | 5th | 6th | 7th | 8th |
|---|---|---|---|---|---|---|---|---|
| focusing state | First | First | First | First | First | First | First | First |
| T1 | 1.265 | 1.705 | 1.739 | 1.824 | 2.422 | 1.948 | 2.118 | 1.835 |
| G12 | 0.050 | 0.050 | 0.050 | 0.050 | 0.050 | 0.050 | 0.139 | 0.062 |
| T2 | 0.676 | 0.508 | 0.683 | 0.819 | 0.582 | 0.300 | 0.520 | 0.605 |
| G23 | 0.424 | 0.655 | 0.528 | 0.744 | 0.477 | 0.593 | 0.375 | 0.747 |
| T3 | 1.742 | 2.108 | 2.037 | 2.087 | 1.523 | 1.846 | 2.741 | 1.816 |
| G34 | 0.050 | 0.783 | 0.056 | 0.995 | 0.484 | 0.972 | 1.100 | 1.096 |
| T4 | 0.627 | 0.799 | 0.799 | 0.888 | 0.630 | 0.396 | 0.846 | 1.135 |
| G45 | 0.258 | 0.527 | 0.170 | 0.609 | 0.548 | 1.058 | 0.567 | 0.504 |
| T5 | 1.636 | 1.981 | 1.826 | 0.956 | 1.749 | 0.748 | 1.320 | 0.799 |
| G5F | 4.706 | 5.164 | 5.930 | 5.113 | 5.378 | 5.311 | 5.206 | 5.208 |
| TF | 0.210 | 0.210 | 0.210 | 0.210 | 0.210 | 0.210 | 0.210 | 0.210 |
| GFP | 0.685 | 0.765 | 1.426 | 0.705 | 0.860 | 1.609 | 1.149 | 1.149 |
| BFL | 5.602 | 6.138 | 7.566 | 6.027 | 6.448 | 7.130 | 6.565 | 6.567 |
| EFL | 9.638 | 13.896 | 14.500 | 13.846 | 14.407 | 14.314 | 15.792 | 14.395 |
| TL | 6.728 | 9.115 | 7.889 | 8.972 | 8.463 | 7.912 | 9.727 | 8.600 |
| TTL | 12.330 | 15.253 | 15.455 | 14.999 | 14.911 | 15.041 | 16.291 | 15.167 |
| ALT | 5.946 | 7.101 | 7.085 | 6.574 | 6.905 | 5.238 | 7.545 | 6.190 |
| AAG | 0.782 | 2.014 | 0.804 | 2.398 | 1.559 | 2.673 | 2.182 | 2.410 |
| HFOV | 19.975 | 14.025 | 13.379 | 14.073 | 13.389 | 13.597 | 12.425 | 13.652 |
| Tmax | 1.742 | 2.108 | 2.037 | 2.087 | 2.422 | 1.948 | 2.741 | 1.835 |
| Tmin | 0.627 | 0.508 | 0.683 | 0.819 | 0.582 | 0.300 | 0.520 | 0.605 |
| Tavg | 1.189 | 1.420 | 1.417 | 1.315 | 1.381 | 1.048 | 1.509 | 1.238 |
| $\Delta G$ | 1.537 | 2.417 | 3.716 | 2.342 | 2.810 | 2.390 | 2.357 | 2.362 |
| $\Delta HFOV$ | 0.216 | 0.320 | 0.944 | 0.462 | 0.732 | 0.418 | 0.406 | 0.427 |
| $\upsilon 1$ | 55.987 | 55.987 | 55.987 | 55.987 | 55.987 | 55.987 | 55.635 | 55.987 |
| $\upsilon 2$ | 23.529 | 23.529 | 23.529 | 23.529 | 23.529 | 23.529 | 23.529 | 26.904 |
| $\upsilon 3$ | 55.987 | 55.987 | 55.987 | 55.987 | 37.666 | 55.987 | 37.490 | 54.517 |
| $\upsilon 4$ | 23.529 | 37.666 | 23.529 | 23.529 | 23.529 | 23.529 | 20.373 | 37.490 |
| $\upsilon 5$ | 55.987 | 55.987 | 55.987 | 55.987 | 55.987 | 55.987 | 55.635 | 55.690 |
| f1 | 16.678 | 13.262 | 11.760 | 12.410 | 8.196 | 13.132 | 14.343 | 14.048 |
| f2 | -9.548 | -9.484 | -8.852 | -9.085 | -5.803 | -9.059 | -10.174 | -10.989 |
| f3 | 4.676 | 6.158 | 6.847 | 6.005 | 6.003 | 6.153 | 6.194 | 6.359 |
| f4 | -5622.883 | 17.995 | 19.595 | 20.436 | 34.278 | 26.525 | -783.278 | 25.275 |
| f5 | -9.806 | -5.655 | -6.921 | -5.882 | -7.061 | -6.635 | -8.402 | -6.731 |

FIG. 38

| Embodiment | 1st | 2nd | 3rd | 4th | 5th | 6th | 7th | 8th |
|---|---|---|---|---|---|---|---|---|
| focusing state | Second | Second | Second | Second | Second | Second | Second | Second |
| T1 | 1.265 | 1.705 | 1.739 | 1.824 | 2.422 | 1.948 | 2.118 | 1.835 |
| G12 | 0.050 | 0.050 | 0.050 | 0.050 | 0.050 | 0.050 | 0.139 | 0.062 |
| T2 | 0.676 | 0.508 | 0.683 | 0.819 | 0.582 | 0.300 | 0.520 | 0.605 |
| G23 | 0.424 | 0.655 | 0.528 | 0.744 | 0.477 | 0.593 | 0.375 | 0.747 |
| T3 | 1.742 | 2.108 | 2.037 | 2.087 | 1.523 | 1.846 | 2.741 | 1.816 |
| G34 | 1.587 | 3.200 | 3.772 | 3.337 | 3.294 | 3.362 | 3.457 | 3.458 |
| T4 | 0.627 | 0.799 | 0.799 | 0.888 | 0.630 | 0.396 | 0.846 | 1.135 |
| G45 | 0.258 | 0.527 | 0.170 | 0.609 | 0.548 | 1.058 | 0.567 | 0.504 |
| T5 | 1.636 | 1.981 | 1.826 | 0.956 | 1.749 | 0.748 | 1.320 | 0.799 |
| G5F | 3.170 | 2.746 | 2.214 | 2.770 | 2.568 | 2.921 | 2.849 | 2.846 |
| TF | 0.210 | 0.210 | 0.210 | 0.210 | 0.210 | 0.210 | 0.210 | 0.210 |
| GFP | 0.685 | 0.765 | 1.426 | 0.705 | 0.860 | 1.609 | 1.149 | 1.149 |
| BFL | 4.065 | 3.721 | 3.850 | 3.685 | 3.638 | 4.740 | 4.208 | 4.205 |
| EFLA | 7.649 | 9.379 | 9.521 | 9.271 | 9.421 | 9.794 | 10.185 | 9.785 |
| TL | 8.265 | 11.532 | 11.604 | 11.314 | 11.273 | 10.302 | 12.083 | 10.962 |
| TTL | 12.330 | 15.253 | 15.455 | 14.999 | 14.911 | 15.041 | 16.291 | 15.167 |
| ALT | 5.946 | 7.101 | 7.085 | 6.574 | 6.905 | 5.238 | 7.545 | 6.190 |
| AAG | 2.319 | 4.431 | 4.520 | 4.740 | 4.369 | 5.063 | 4.538 | 4.772 |
| HFOV | 20.191 | 13.705 | 12.435 | 13.611 | 12.657 | 13.179 | 12.019 | 13.225 |
| Tmax | 1.742 | 2.108 | 2.037 | 2.087 | 2.422 | 1.948 | 2.741 | 1.835 |
| Tmin | 0.627 | 0.508 | 0.683 | 0.819 | 0.582 | 0.300 | 0.520 | 0.605 |
| Tavg | 1.189 | 1.420 | 1.417 | 1.315 | 1.381 | 1.048 | 1.509 | 1.238 |
| ΔG | 1.537 | 2.417 | 3.716 | 2.342 | 2.810 | 2.390 | 2.357 | 2.362 |
| ΔHFOV | 0.216 | 0.320 | 0.944 | 0.462 | 0.732 | 0.418 | 0.406 | 0.427 |
| υ1 | 55.987 | 55.987 | 55.987 | 55.987 | 55.987 | 55.987 | 55.635 | 55.987 |
| υ2 | 23.529 | 23.529 | 23.529 | 23.529 | 23.529 | 23.529 | 23.529 | 26.904 |
| υ3 | 55.987 | 55.987 | 55.987 | 55.987 | 37.666 | 55.987 | 37.490 | 54.517 |
| υ4 | 23.529 | 37.666 | 23.529 | 23.529 | 23.529 | 23.529 | 20.373 | 37.490 |
| υ5 | 55.987 | 55.987 | 55.987 | 55.987 | 55.987 | 55.987 | 55.635 | 55.690 |
| f1 | 16.678 | 13.262 | 11.760 | 12.410 | 8.196 | 13.132 | 14.343 | 14.048 |
| f2 | -9.548 | -9.484 | -8.852 | -9.085 | -5.803 | -9.059 | -10.174 | -10.989 |
| f3 | 4.676 | 6.158 | 6.847 | 6.005 | 6.003 | 6.153 | 6.194 | 6.359 |
| f4 | -5622.883 | 17.995 | 19.595 | 20.436 | 34.278 | 26.525 | -783.278 | 25.275 |
| f5 | -9.806 | -5.655 | -6.921 | -5.882 | -7.061 | -6.635 | -8.402 | -6.731 |

FIG. 39

| Embodiment | 1st | 2nd | 3rd | 4th | 5th | 6th | 7th | 8th |
|---|---|---|---|---|---|---|---|---|
| focusing state | First | First | First | First | First | First | First | First |
| EFL/EFLA | 1.260 | 1.482 | 1.523 | 1.494 | 1.529 | 1.462 | 1.551 | 1.471 |
| υ2+υ3+υ4 | 103.045 | 117.181 | 103.045 | 103.045 | 84.723 | 103.045 | 81.391 | 118.911 |
| TTL/(T1+G45) | 8.099 | 6.835 | 8.097 | 6.165 | 5.022 | 5.003 | 6.067 | 6.483 |
| AAG/T1 | 0.619 | 1.181 | 0.462 | 1.315 | 0.644 | 1.372 | 1.030 | 1.313 |
| ΔHFOV*TTL/ALT | 0.448 | 0.687 | 2.059 | 1.054 | 1.581 | 1.200 | 0.877 | 1.046 |
| T3/(G12+T2) | 2.401 | 3.779 | 2.778 | 2.401 | 2.410 | 5.273 | 4.160 | 2.721 |
| TL/BFL | 1.201 | 1.485 | 1.043 | 1.489 | 1.313 | 1.110 | 1.482 | 1.310 |
| υ1+υ3+υ5 | 167.961 | 167.961 | 167.961 | 167.961 | 149.640 | 167.961 | 148.759 | 166.194 |
| TTL/(T3+T5) | 3.649 | 3.730 | 4.001 | 4.929 | 4.558 | 5.799 | 4.011 | 5.800 |
| (G23+T4+G45)/T1 | 1.036 | 1.162 | 0.861 | 1.229 | 0.683 | 1.051 | 0.844 | 1.300 |
| ALT/ΔHFOV | 27.528 | 22.190 | 7.505 | 14.229 | 9.432 | 12.532 | 18.584 | 14.497 |
| (T3+G34+T4)/(G12+G23) | 5.100 | 5.236 | 5.001 | 5.001 | 5.001 | 5.001 | 9.111 | 5.000 |
| T3/T4 | 2.778 | 2.637 | 2.549 | 2.351 | 2.418 | 4.655 | 3.242 | 1.600 |
| (υ1+υ5)/(υ2+υ4) | 2.380 | 1.830 | 2.380 | 2.380 | 2.380 | 2.380 | 2.534 | 1.734 |
| TL/(G34+T5) | 3.990 | 3.297 | 4.192 | 4.599 | 3.791 | 4.599 | 4.018 | 4.536 |
| (AAG+BFL)/ALT | 1.074 | 1.148 | 1.181 | 1.282 | 1.160 | 1.871 | 1.159 | 1.450 |
| ALT/ΔG | 3.869 | 2.938 | 1.907 | 2.807 | 2.457 | 2.192 | 3.201 | 2.621 |
| (T1+T3+T5)/(G12+T2+G23) | 4.037 | 4.779 | 4.441 | 3.017 | 5.134 | 4.818 | 5.976 | 3.147 |
| ALT/Tmax | 3.413 | 3.369 | 3.478 | 3.150 | 2.851 | 2.689 | 2.753 | 3.372 |
| TTL/Tavg | 10.368 | 10.740 | 10.907 | 11.408 | 10.798 | 14.357 | 10.796 | 12.251 |
| Tmax/Tmin | 2.778 | 4.151 | 2.982 | 2.548 | 4.163 | 6.494 | 5.274 | 3.034 |
| (f1+f2)/f5 | -0.727 | -0.668 | -0.420 | -0.565 | -0.339 | -0.614 | -0.496 | -0.454 |
| (f2+f3)/f4 | 0.001 | -0.185 | -0.102 | -0.151 | 0.006 | -0.110 | 0.005 | -0.183 |
| f2/f3 | -2.042 | -1.540 | -1.293 | -1.513 | -0.967 | -1.472 | -1.643 | -1.728 |
| f2/f4 | 0.002 | -0.527 | -0.452 | -0.445 | -0.169 | -0.342 | 0.013 | -0.435 |
| (f2+f3)/f5 | 0.497 | 0.588 | 0.290 | 0.524 | -0.028 | 0.438 | 0.474 | 0.688 |

FIG. 40

| Embodiment | 1st | 2nd | 3rd | 4th | 5th | 6th | 7th | 8th |
|---|---|---|---|---|---|---|---|---|
| focusing state | Second | Second | Second | Second | Second | Second | Second | Second |
| EFL/EFLA | 1.260 | 1.482 | 1.523 | 1.494 | 1.529 | 1.462 | 1.551 | 1.471 |
| $\upsilon 2+\upsilon 3+\upsilon 4$ | 103.045 | 117.181 | 103.045 | 103.045 | 84.723 | 103.045 | 81.391 | 118.911 |
| TTL/(T1+G45) | 8.099 | 6.835 | 8.097 | 6.165 | 5.022 | 5.003 | 6.067 | 6.483 |
| AAG/T1 | 1.834 | 2.599 | 2.599 | 2.599 | 1.804 | 2.599 | 2.142 | 2.600 |
| ΔHFOV*TTL/ALT | 0.448 | 0.687 | 2.059 | 1.054 | 1.581 | 1.200 | 0.877 | 1.046 |
| T3/(G12+T2) | 2.401 | 3.779 | 2.778 | 2.401 | 2.410 | 5.273 | 4.160 | 2.721 |
| TL/BFL | 2.033 | 3.099 | 3.014 | 3.070 | 3.099 | 2.173 | 2.872 | 2.607 |
| $\upsilon 1+\upsilon 3+\upsilon 5$ | 167.961 | 167.961 | 167.961 | 167.961 | 149.640 | 167.961 | 148.759 | 166.194 |
| TTL/(T3+T5) | 3.649 | 3.730 | 4.001 | 4.929 | 4.558 | 5.799 | 4.011 | 5.800 |
| (G23+T4+G45)/T1 | 1.036 | 1.162 | 0.861 | 1.229 | 0.683 | 1.051 | 0.844 | 1.300 |
| ALT/ΔHFOV | 27.528 | 22.190 | 7.505 | 14.229 | 9.432 | 12.532 | 18.584 | 14.497 |
| (T3+G34+T4)/(G12+G23) | 8.339 | 8.666 | 11.426 | 7.952 | 10.331 | 8.719 | 13.692 | 7.919 |
| T3/T4 | 2.778 | 2.637 | 2.549 | 2.351 | 2.418 | 4.655 | 3.242 | 1.600 |
| $(\upsilon 1+\upsilon 5)/(\upsilon 2+\upsilon 4)$ | 2.380 | 1.830 | 2.380 | 2.380 | 2.380 | 2.380 | 2.534 | 1.734 |
| TL/(G34+T5) | 2.564 | 2.226 | 2.073 | 2.635 | 2.236 | 2.506 | 2.529 | 2.575 |
| (AAG+BFL)/ALT | 1.074 | 1.148 | 1.181 | 1.282 | 1.160 | 1.871 | 1.159 | 1.450 |
| ALT/ΔG | 3.869 | 2.938 | 1.907 | 2.807 | 2.457 | 2.192 | 3.201 | 2.621 |
| (T1+T3+T5)/(G12+T2+G23) | 4.037 | 4.779 | 4.441 | 3.017 | 5.134 | 4.818 | 5.976 | 3.147 |
| ALT/Tmax | 3.413 | 3.369 | 3.478 | 3.150 | 2.851 | 2.689 | 2.753 | 3.372 |
| TTL/Tavg | 10.368 | 10.740 | 10.907 | 11.408 | 10.798 | 14.357 | 10.796 | 12.251 |
| Tmax/Tmin | 2.778 | 4.151 | 2.982 | 2.548 | 4.163 | 6.494 | 5.274 | 3.034 |
| (f1+f2)/f5 | -0.727 | -0.668 | -0.420 | -0.565 | -0.339 | -0.614 | -0.496 | -0.454 |
| (f2+f3)/f4 | 0.001 | -0.185 | -0.102 | -0.151 | 0.006 | -0.110 | 0.005 | -0.183 |
| f2/f3 | -2.042 | -1.540 | -1.293 | -1.513 | -0.967 | -1.472 | -1.643 | -1.728 |
| f2/f4 | 0.002 | -0.527 | -0.452 | -0.445 | -0.169 | -0.342 | 0.013 | -0.435 |
| (f2+f3)/f5 | 0.497 | 0.588 | 0.290 | 0.524 | -0.028 | 0.438 | 0.474 | 0.688 |

FIG. 41

OPTICAL IMAGING LENS

BACKGROUND OF THE INVENTION

1. Field of the Invention

The present invention generally relates to an optical imaging lens. Specifically speaking, the present invention is directed to an optical imaging lens for use in such as a mobile phone, a camera, a tablet personal computer, or for use in a vehicle device, a head-mounted display device (AR, VR, MR) for taking pictures or for recording videos.

2. Description of the Prior Art

Over the years, an optical imaging lens is evolving and has a wider range of applications. In addition to being small in size, the demands for a video recording function of electronic products are also increasing.

However, the arrangement of multiple lenses takes up more space when the photographic system is composed of multiple lenses of different functions and supplemented by software processing. Therefore, using a single lens to meet different photographic needs and to design a lens which is light, thin, small and short, to have an infinite object distance, and to be capable of macro focusing as well has become a present issue which is urgently needed to be solved.

SUMMARY OF THE INVENTION

In the light of the above, various embodiments of the present invention propose an optical imaging lens which has a small size, has a focusing function, has excellent imaging quality, has good optical performance and is technically possible. The optical imaging lens of the present invention from an object side to an image side in order along an optical axis has a first lens element, a second lens element, a third lens element, a fourth lens element and a fifth lens element. Each of the first lens element, the second lens element, the third lens element, the fourth lens element and the fifth lens element respectively has an object-side surface which faces toward the object side and allows imaging rays to pass through as well as an image-side surface which faces toward the image side and allows the imaging rays to pass through. The distances of the air gaps between adjacent the first lens element, the second lens element, the third lens element, the fourth lens element and the fifth lens element are variable.

In one embodiment, from an object side to an image side in order along an optical axis the optical imaging lens includes an aperture stop, a front lens group, and a rear lens group. The front lens group includes at least two lens elements. The first lens element of the front lens group is arranged to be a lens element in a first order from the object side. The first lens element has positive refracting power. The second lens element of the front lens group is arranged to be a lens element in a second order from the object side. An optical axis region of the object-side surface of the second lens element is convex, or a periphery region of the object-side surface of the second lens element is convex. The rear lens group includes at least one lens element. The fifth lens element of the rear lens group is arranged to be a lens element in a first order from the image side. Lens elements included by the optical imaging lens are only five lens elements. The rear lens group enables the optical imaging lens to form a first focusing state and a second focusing state by moving along the optical axis. EFL is an effective focal length of the first focusing state and EFLA is an effective focal length of the second focusing state to satisfy EFL/EFLA≥1.200.

In another embodiment, from an object side to an image side in order along an optical axis the optical imaging lens includes a front lens group and a rear lens group. The front lens group includes at least three lens elements. The first lens element of the front lens group is arranged to be a lens element in a first order from the object side. The first lens element has positive refracting power. The second lens element of the front lens group is arranged to be a lens element in a second order from the object side. An optical axis region of the object-side surface of the second lens element is convex, or a periphery region of the object-side surface of the second lens element is convex. The third lens element of the front lens group is arranged to be a lens element in a third order from the object side. The third lens element has positive refracting power. The rear lens group includes at least one lens element. The fifth lens element of the rear lens group is arranged to be a lens element in a first order from the image side. The fifth lens element has negative refracting power. Lens elements included by the optical imaging lens are only five lens elements. The rear lens group enables the optical imaging lens to form a first focusing state and a second focusing state by moving along the optical axis. EFL is an effective focal length of the first focusing state and EFLA is an effective focal length of the second focusing state to satisfy EFL/EFLA≥1.200.

In another embodiment, from an object side to an image side in order along an optical axis the optical imaging lens includes a front lens group and a rear lens group. The front lens group includes at least three lens elements. The first lens element of the front lens group is arranged to be a lens element in a first order from the object side. The first lens element has positive refracting power. The second lens element of the front lens group is arranged to be a lens element in a second order from the object side. An optical axis region of the object-side surface of the second lens element is convex, or a periphery region of the object-side surface of the second lens element is convex. The third lens element of the front lens group is arranged to be a lens element in a third order from the object side. An optical axis region of the object-side surface of the third lens element is convex. The rear lens group includes at least one lens element. The fifth lens element of the rear lens group is arranged to be a lens element in a first order from the image side. The fifth lens element has negative refracting power. Lens elements included by the optical imaging lens are only five lens elements. The rear lens group enables the optical imaging lens to form a first focusing state and a second focusing state by moving along the optical axis. EFL is an effective focal length of the first focusing state and EFLA is an effective focal length of the second focusing state to satisfy EFL/EFLA≥1.200.

In the optical imaging lens of the present invention, the embodiments may also selectively satisfy the following numerical conditions:

$\upsilon 2+\upsilon 3+\upsilon 4 \leq 120.000$;

$TTL/(T1+G45) \leq 8.100$;

$AAG/T1 \leq 2.600$;

$\Delta HFOV*TTL/ALT \leq 2.200$ degrees;

$T3/(G12+T2) \geq 2.400$;

$TL/BFL \leq 3.100$;

$\upsilon 1+\upsilon 3+\upsilon 5 \geq 145.000$;

$TTL/(T3+T5) \leq 5.800$;

$(G23+T4+G45)/T1 \leq 1.300$;

$ALT/\Delta HFOV \geq 5.000$ mm/degrees;

$(T3+G34+T4)/(G12+G23) \geq 5.000$;

$T3/T4 \geq 1.600$;

$(\upsilon 1+\upsilon 5)/(\upsilon 2+\upsilon 4) \geq 1.700$;

$TL/(G34+T5) \leq 4.600$;

$(AAG+BFL)/ALT \leq 1.900$;

$ALT/\Delta G \geq 1.900$;

$(T1+T3+T5)/(G12+T2+G23) \geq 3.000$;

$(f1+f2)/f5 \leq 0.000$;

$(f2+f3)/f4 \geq -0.200$;

$f2/f3 \geq -2.200$;

$f2/f4 \leq 0.500$;

$(f2+f3)/f5 \leq 0.750$;

$ALT/Tmax \geq 2.600$;

$TTL/Tavg \leq 15.000$;

$Tmax/Tmin \geq 2.500$.

Wherein, T1 is a thickness of the first lens element along the optical axis; T2 is a thickness of the second lens element along the optical axis; T3 is a thickness of the third lens element along the optical axis; T4 is a thickness of a fourth lens element along the optical axis; T5 is a thickness of the fifth lens element along the optical axis. G12 is an air gap between the first lens element and the second lens element along the optical axis; G23 is an air gap between the second lens element and the third lens element along the optical axis; G34 is an air gap between the third lens element and the fourth lens element along the optical axis; G45 is an air gap between the fourth lens element and the fifth lens element along the optical axis. Moreover, f1 is a focal length of the first lens element; f2 is a focal length of the second lens element; f3 is a focal length of the third lens element; f4 is a focal length of the fourth lens element; f5 is a focal length of the fifth lens element. AAG is a sum of four air gaps from the first lens element to the fifth lens element along the optical axis. $\Delta G$ is an absolute value of a difference of a sum of four air gaps of the optical imaging lens between the first focusing state $AAG_1$ and the second focusing state $AAG_2$, i.e. $\Delta G=|AAG_1-AAG_2|$.

Further, it is defined that $\upsilon 1$ is an Abbe number of the first lens element, $\upsilon 2$ is an Abbe number of the second lens element, $\upsilon 3$ is an Abbe number of the third lens element, $\upsilon 4$ is an Abbe number of the fourth lens element, and $\upsilon 5$ is an Abbe number of the fifth lens element. ALT is a sum of thicknesses of the five lens elements from the first lens element to the fifth lens element along the optical axis. Tmax is the maximal thickness of the five lens elements from the first lens element to the fifth lens element along the optical axis, i.e. the maximal thickness of T1, T2, T3, T4, and T5. Tmin is the minimal thickness of the five lens elements from the first lens element to the fifth lens element along the optical axis, i.e. the minimal thickness of T1, T2, T3, T4, and T5. Tavg is an average value of the five lens elements from the first lens element to the fifth lens element along the optical axis, i.e. Tavg=ALT/5. TL is a distance from the object-side surface of the first lens element to an image-side surface of the fifth lens element along the optical axis; TTL is a distance from the object-side surface of the first lens element to an image plane along the optical axis; BFL is a distance from the image-side surface of the fifth lens element to the image plane along the optical axis. EFL is an effective focal length of the first focusing state and EFLA is an effective focal length of the second focusing state. HFOV is a half field of view of the optical imaging lens. $\Delta HFOV$ is an absolute value of a difference of the half field of view of the optical imaging lens between the first focusing state and the second focusing state.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 7A illustrates the longitudinal spherical aberration on the image plane at the first focusing state of the first embodiment.

FIG. 7B illustrates the field curvature aberration on the sagittal direction at the first focusing state of the first embodiment.

FIG. 7C illustrates the field curvature aberration on the tangential direction at the first focusing state of the first embodiment.

FIG. 7D illustrates the distortion aberration at the first focusing state of the first embodiment.

FIG. 7E illustrates the longitudinal spherical aberration on the image plane at the second focusing state of the first embodiment.

FIG. 7F illustrates the field curvature aberration on the sagittal direction at the second focusing state of the first embodiment.

FIG. 7G illustrates the field curvature aberration on the tangential direction at the second focusing state of the first embodiment.

FIG. 7H illustrates the distortion aberration at the second focusing state of the first embodiment.

FIG. 9A illustrates the longitudinal spherical aberration on the image plane at the first focusing state of the second embodiment.

FIG. 9B illustrates the field curvature aberration on the sagittal direction at the first focusing state of the second embodiment.

FIG. 9C illustrates the field curvature aberration on the tangential direction at the first focusing state of the second embodiment.

FIG. 9D illustrates the distortion aberration at the first focusing state of the second embodiment.

FIG. 9E illustrates the longitudinal spherical aberration on the image plane at the second focusing state of the second embodiment.

FIG. 9F illustrates the field curvature aberration on the sagittal direction at the second focusing state of the second embodiment.

FIG. 9G illustrates the field curvature aberration on the tangential direction at the second focusing state of the second embodiment.

FIG. 9H illustrates the distortion aberration at the second focusing state of the second embodiment.

FIG. 11A illustrates the longitudinal spherical aberration on the image plane at the first focusing state of the third embodiment.

FIG. 11B illustrates the field curvature aberration on the sagittal direction at the first focusing state of the third embodiment.

FIG. 11C illustrates the field curvature aberration on the tangential direction at the first focusing state of the third embodiment.

FIG. 11D illustrates the distortion aberration at the first focusing state of the third embodiment.

FIG. 11E illustrates the longitudinal spherical aberration on the image plane at the second focusing state of the third embodiment.

FIG. 11F illustrates the field curvature aberration on the sagittal direction at the second focusing state of the third embodiment.

FIG. 11G illustrates the field curvature aberration on the tangential direction at the second focusing state of the third embodiment.

FIG. 11H illustrates the distortion aberration at the second focusing state of the third embodiment.

FIG. 13A illustrates the longitudinal spherical aberration on the image plane at the first focusing state of the fourth embodiment.

FIG. 13B illustrates the field curvature aberration on the sagittal direction at the first focusing state of the fourth embodiment.

FIG. 13C illustrates the field curvature aberration on the tangential direction at the first focusing state of the fourth embodiment.

FIG. 13D illustrates the distortion aberration at the first focusing state of the fourth embodiment.

FIG. 13E illustrates the longitudinal spherical aberration on the image plane at the second focusing state of the fourth embodiment.

FIG. 13F illustrates the field curvature aberration on the sagittal direction at the second focusing state of the fourth embodiment.

FIG. 13G illustrates the field curvature aberration on the tangential direction at the second focusing state of the fourth embodiment.

FIG. 13H illustrates the distortion aberration at the second focusing state of the fourth embodiment.

FIG. 15A illustrates the longitudinal spherical aberration on the image plane at the first focusing state of the fifth embodiment.

FIG. 15B illustrates the field curvature aberration on the sagittal direction at the first focusing state of the fifth embodiment.

FIG. 15C illustrates the field curvature aberration on the tangential direction at the first focusing state of the fifth embodiment.

FIG. 15D illustrates the distortion aberration at the first focusing state of the fifth embodiment.

FIG. 15E illustrates the longitudinal spherical aberration on the image plane at the second focusing state of the fifth embodiment.

FIG. 15F illustrates the field curvature aberration on the sagittal direction at the second focusing state of the fifth embodiment.

FIG. 15G illustrates the field curvature aberration on the tangential direction at the second focusing state of the fifth embodiment.

FIG. 15H illustrates the distortion aberration at the second focusing state of the fifth embodiment.

FIG. 19A illustrates the longitudinal spherical aberration on the image plane at the first focusing state of the seventh embodiment.

FIG. 19B illustrates the field curvature aberration on the sagittal direction at the first focusing state of the seventh embodiment.

FIG. 19C illustrates the field curvature aberration on the tangential direction at the first focusing state of the seventh embodiment.

FIG. 19D illustrates the distortion aberration at the first focusing state of the seventh embodiment.

FIG. 19E illustrates the longitudinal spherical aberration on the image plane at the second focusing state of the seventh embodiment.

FIG. 19F illustrates the field curvature aberration on the sagittal direction at the second focusing state of the seventh embodiment.

FIG. 19G illustrates the field curvature aberration on the tangential direction at the second focusing state of the seventh embodiment.

FIG. 19H illustrates the distortion aberration at the second focusing state of the seventh embodiment.

FIG. 21A illustrates the longitudinal spherical aberration on the image plane at the first focusing state of the eighth embodiment.

FIG. 21B illustrates the field curvature aberration on the sagittal direction at the first focusing state of the eighth embodiment.

FIG. 21C illustrates the field curvature aberration on the tangential direction at the first focusing state of the eighth embodiment.

FIG. 21D illustrates the distortion aberration at the first focusing state of the eighth embodiment.

FIG. 21E illustrates the longitudinal spherical aberration on the image plane at the second focusing state of the eighth embodiment.

FIG. 21F illustrates the field curvature aberration on the sagittal direction at the second focusing state of the eighth embodiment.

FIG. 21G illustrates the field curvature aberration on the tangential direction at the second focusing state of the eighth embodiment.

FIG. 21H illustrates the distortion aberration at the second focusing state of the eighth embodiment.

FIG. 22 shows the optical data of the first embodiment of the optical imaging lens.

FIG. 23 shows the aspheric surface data of the first embodiment.

FIG. 24 shows the optical data of the second embodiment of the optical imaging lens.

FIG. 25 shows the aspheric surface data of the second embodiment.

FIG. 26 shows the optical data of the third embodiment of the optical imaging lens.

FIG. 27 shows the aspheric surface data of the third embodiment.

FIG. 28 shows the optical data of the fourth embodiment of the optical imaging lens.

FIG. 29 shows the aspheric surface data of the fourth embodiment.

FIG. 30 shows the optical data of the fifth embodiment of the optical imaging lens.

FIG. 31 shows the aspheric surface data of the fifth embodiment.

FIG. 32 shows the optical data of the sixth embodiment of the optical imaging lens.

FIG. 33 shows the aspheric surface data of the sixth embodiment.

FIG. 34 shows the optical data of the seventh embodiment of the optical imaging lens.

FIG. 35 shows the aspheric surface data of the seventh embodiment.

FIG. 36 shows the optical data of the eighth embodiment of the optical imaging lens.

FIG. 37 shows the aspheric surface data of the eighth embodiment.

FIG. 38 shows some important parameter and ratios in the embodiments of the first focusing state.

FIG. 39 shows some important parameter and ratios in the embodiments of the first focusing state.

FIG. 40 shows some important parameter and ratios in the embodiments of the second focusing state.

FIG. 41 shows some important parameter and ratios in the embodiments of the second focusing state.

DETAILED DESCRIPTION

The terms "optical axis region", "periphery region", "concave", and "convex" used in this specification and claims should be interpreted based on the definition listed in the specification by the principle of lexicographer.

Figure 1:
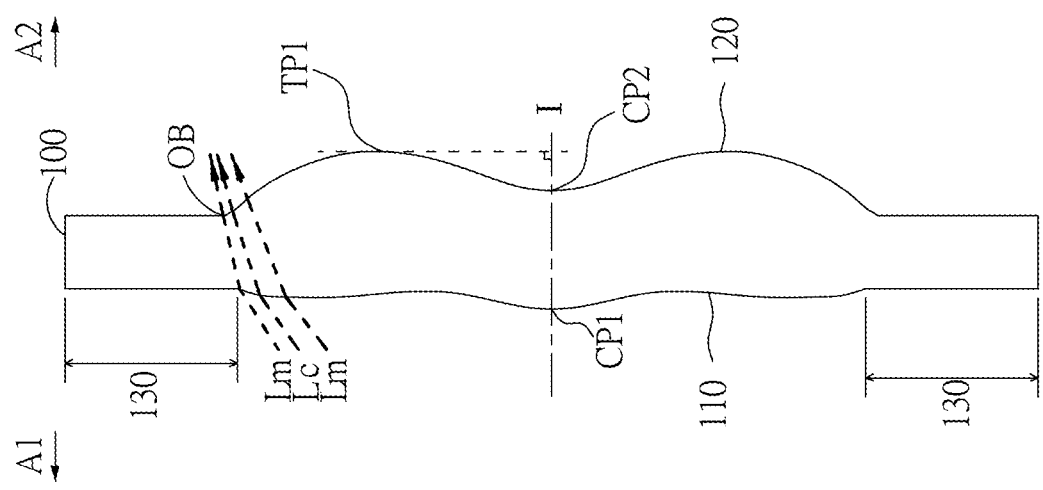

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
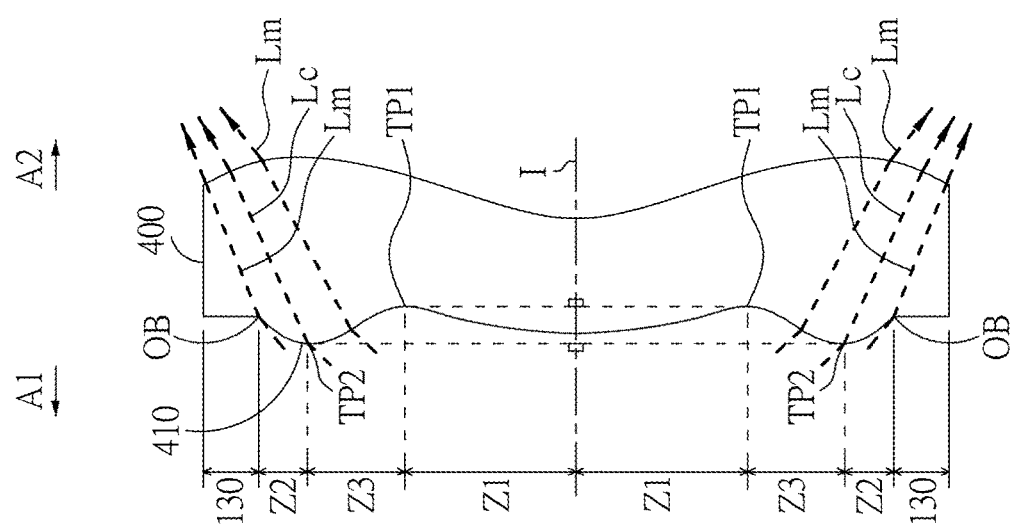

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. A surface of the lens element 100 may have no transition point or have at least one transition point. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

When a surface of the lens element has at least one transition point, the region of the surface of the lens element from the central point to the first transition point TP1 is defined as the optical axis region, which includes the central point. The region located radially outside of the farthest transition point (the Nth transition point) from the optical axis I to the optical boundary OB of the surface of the lens element is defined as the periphery region. In some embodiments, there may be intermediate regions present between the optical axis region and the periphery region, with the number of intermediate regions depending on the number of the transition points. When a surface of the lens element has no transition point, the optical axis region is defined as a region of 0%-50% of the distance between the optical axis I and the optical boundary OB of the surface of the lens element, and the periphery region is defined as a region of 50%-100% of the distance between the optical axis I and the optical boundary OB of the surface of the lens element.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
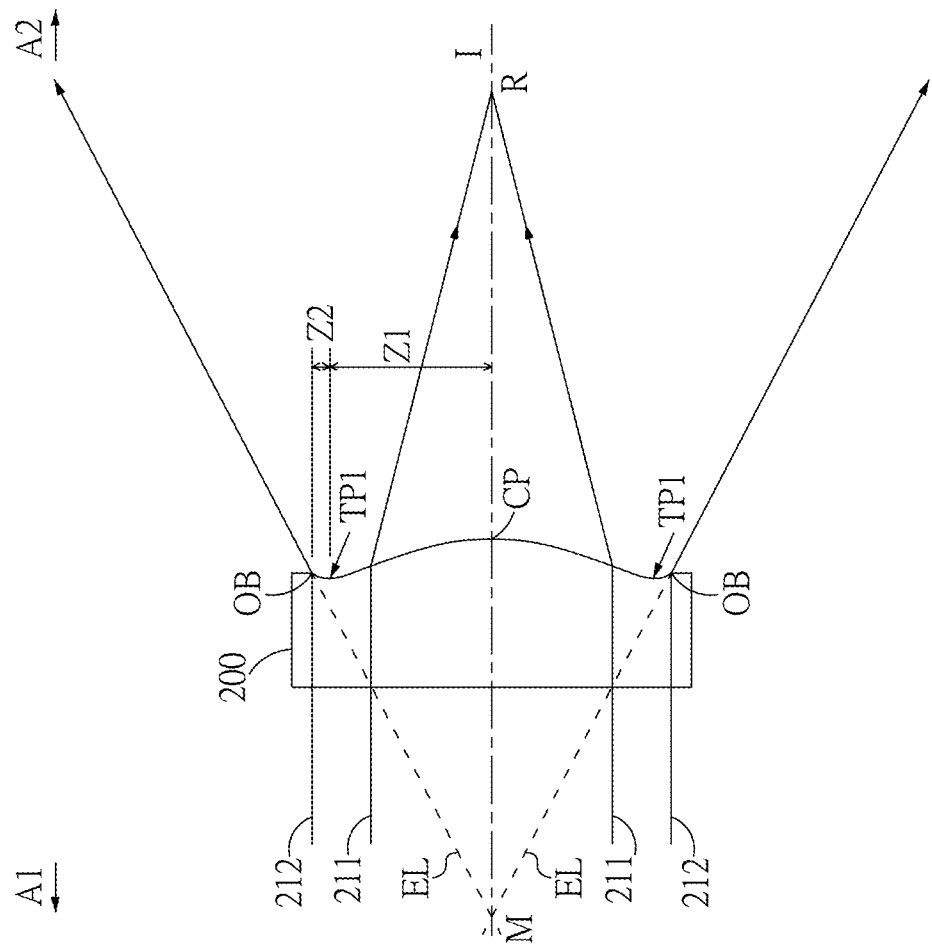
FIGS. 1-5 illustrate the methods for determining the surface shapes and for determining an optical axis region and a periphery region of one lens element.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis Ion the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius of curvature" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex-(concave-) region," can be used alternatively.

Figure 5:
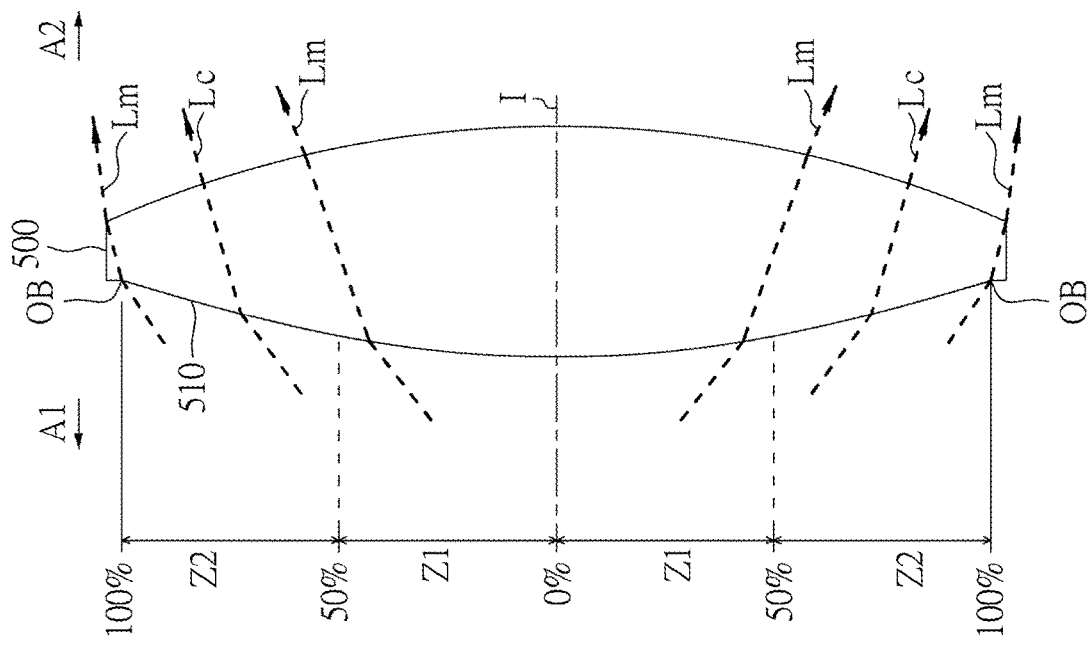
Figure 3:
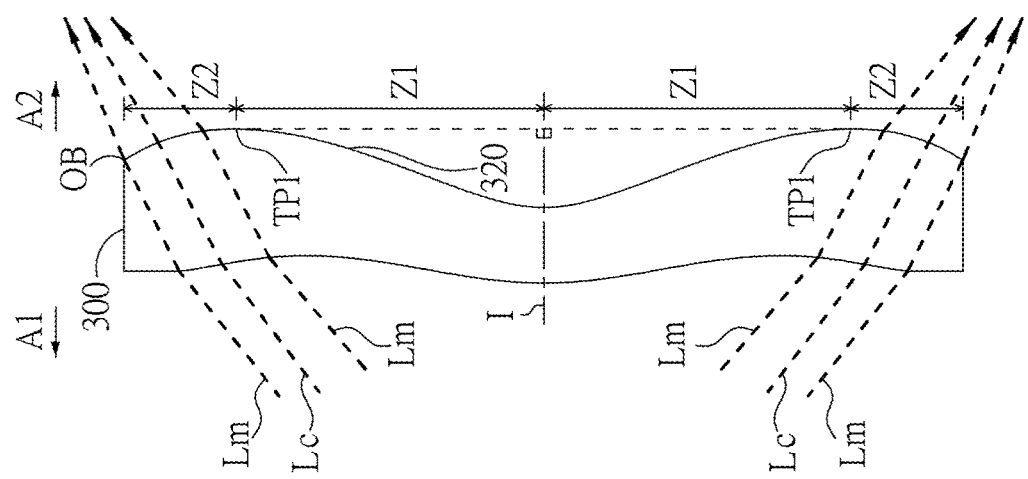

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region of 0%-50% of the distance between the optical axis I and the optical boundary OB of the surface of the lens element and the periphery region is defined as the region of 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

Figure 6:
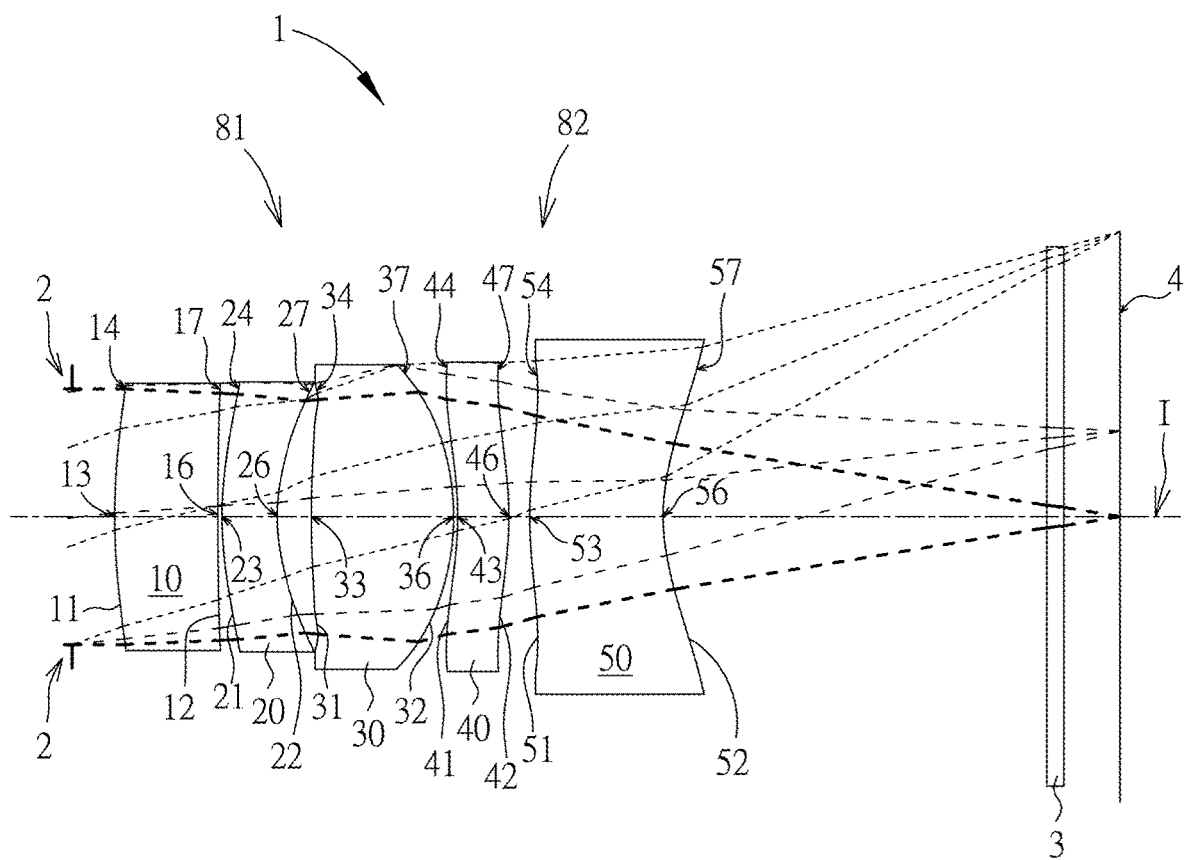
FIG. 6 illustrates a first embodiment of the optical imaging lens of the present invention.

As shown in FIG. 6, the optical imaging lens 1 which is mainly composed of five lens elements of the present invention, sequentially located from an object side A1 (where an object is located) to an image side A2 along an optical axis I, has an aperture stop 2, a front lens group 81, a rear lens group 82 and an image plane 4. In one embodiment of the present invention, the front lens group 81 includes at least two lens elements. Alternatively, in another embodiment of the present invention, the front lens group 81 includes at least three lens elements. A lens element in a first order from the object side A1 is a first lens element 10 of the front lens group 81, a lens element in a second order from the object side A1 is a second lens element 20 of the front lens group 81, and a lens element in a third order from the object side A1 is a third lens element 30 of the front lens group 81. For example, in one example of the present invention, the front lens group 81 may include the first lens element 10 and the second lens element 20. Alternatively, in another example of the present invention, the front lens group 81 may include the first lens element 10, the second lens element 20 and the third lens element 30, but the present invention is not limited thereto. In another embodiment of the present invention, the rear lens group 82 may include at least one lens element. For example, a lens element in a first order from the image side A2 is a fifth lens element 50 of the rear lens group 82, but the present invention is not limited thereto.

The rear lens group 82 may enable the optical imaging lens 1 to form different focusing states, for example to form a first focusing state and a second focusing state by moving along the optical axis I. The first focusing state and the second focusing state may be one of an infinite object distance and a finite object distance. In one embodiment of the present invention, the first focusing state may have the infinite object distance. In another embodiment of the present invention, the second focusing state may have the finite object distance, for example a macro focusing state, but the present invention is not limited thereto.

Generally speaking, the first lens element 10, the second lens element 20, the third lens element 30, a fourth lens element 40 and the fifth lens element 50 may be made of a transparent plastic material but the present invention is not limited to this, and each lens element has an appropriate refracting power. In the present invention, lens elements having refracting power included by the optical imaging lens 1 are only the five lens elements (the first lens element 10, the second lens element 20, the third lens element 30, the fourth lens element 40 and the fifth lens element 50) described above. The optical axis I is the optical axis of the entire optical imaging lens 1, and the optical axis of each of the lens elements coincides with the optical axis of the optical imaging lens 1.

Furthermore, the optical imaging lens 1 includes an aperture stop 2 disposed in an appropriate position. In FIG. 6, the aperture stop 2 is disposed at the side of the first lens element 10 facing the object side A1, in other words, between the object side A1 and the first lens element 10. When imaging rays emitted or reflected by an object (not shown) which is located at the object side A1 enters the optical imaging lens 1 of the present invention, it forms a clear and sharp image on the image plane 4 at the image side A2 after passing through the aperture stop 2, the first lens element 10, the second lens element 20, the third lens element 30, the fourth lens element 40, the fifth lens element 50 and the filter 3. In one embodiment of the present invention, the filter 3 may be a filter of various suitable functions to filter out light of a specific wavelength, for example an infrared cut-off filter, and is placed between the fifth lens element 50 and the image plane 4 to keep infrared ray in the imaging rays from reaching the image plane 4 to jeopardize the imaging quality.

Each lens element, for example the first lens element 10, the second lens element 20, the third lens element 30, the fourth lens element 40 and the fifth lens element 50 in the optical imaging lens 1 of the present invention has an object-side surface facing toward the object side A1 and allowing imaging rays to pass through as well as an image-side surface facing toward the image side A2 and allowing the imaging rays to pass through. For example, the first lens element 10 has an object-side surface 11 and an image-side surface 12; the second lens element 20 has an object-side surface 21 and an image-side surface 22; the third lens element 30 has an object-side surface 31 and an image-side surface 32; the fourth lens element 40 has an object-side surface 41 and an image-side surface 42; the fifth lens element 50 has an object-side surface 51 and an image-side surface 52. Furthermore, each object-side surface and image-side surface of lens elements in the optical imaging lens 1 of present invention has an optical axis region and a periphery region.

Each lens element in the optical imaging lens 1 of the present invention further has a thickness T along the optical axis I. For example, the first lens element 10 has a first lens element thickness T1, the second lens element 20 has a second lens element thickness T2, the third lens element 30 has a third lens element thickness T3, the fourth lens element 40 has a fourth lens element thickness T4 and the fifth lens element 50 has a fifth lens element thickness T5. Therefore, a sum of thicknesses of all the five lens elements, for example the first lens element 10, the second lens element 20, the third lens element 30, the fourth lens element 40, the fifth lens element 50, in the optical imaging lens 1 along the optical axis I is ALT=T1+T2+T3+T4+T5. Tmax is the maximal thickness of the five lens elements among the first lens element 10 and the fifth lens element 50 along the optical axis I, i.e., the maximal value among T1, T2, T3, T4 and T5. Tmin is the minimal thickness of the five lens elements among the first lens element 10 and the fifth lens element 50 along the optical axis I, i.e., the minimal value among T1, T2, T3, T4 and T5. Tavg is the average value of the five thicknesses of the five lens elements among the first lens element 10 and the fifth lens element 50 along the optical axis I, i.e., Tavg=ALT/5.

In addition, between two adjacent lens elements in the optical imaging lens 1 of the present invention there may be an air gap distance along the optical axis I. The design of the optical imaging lens 1 of the present invention is a focusing lens so the air gap distance between two adjacent lens elements may be variable. For example, there is an air gap G12 between the first lens element 10 and the second lens element 20, an air gap G23 between the second lens element 20 and the third lens element 30, an air gap G34 between the third lens element 30 and the fourth lens element 40 and air gap G45 between the fourth lens element 40 and the fifth lens element 50. Therefore, a sum of four air gaps from the first lens element 10 to the fifth lens element 50 along the optical axis I is AAG, i.e., AAG=G12+G23+G34+G45. $AAG_1$ is a sum of the air gap distances of the optical imaging lens 1 along the optical axis I at the first focusing state and AAG 2 is a sum of the air gap distances of the optical imaging lens 1 along the optical axis I at the second focusing state while ΔG is an absolute value of a difference of a sum of the air gap distances of the optical imaging lens 1 between the first focusing state $AAG_1$ and the second focusing state $AAG_2$, i.e. AG=|$AAG_1$-$AAG_2$|.

In addition, a distance from the object-side surface 11 of the first lens element 10 to the image plane 4 along the optical axis I is TTL, namely a system length of the optical imaging lens 1; a distance from the object-side surface 11 of the first lens element 10 to the image-side surface 52 of the fifth lens element 50 along the optical axis I is TL. ImgH is an image height of the optical imaging lens 1. Fno is the f-number of the optical imaging lens 1. EFL is an effective focal length of the optical imaging lens 1 at the first focusing state which is formed by moving the rear lens group 82 in the optical imaging lens 1 along the optical axis I and EFLA is an effective focal length of the optical imaging lens 1 at the second focusing state. HFOV stands for the half field of view of the optical imaging lens 1, i.e. half of the field of view. ΔHFOV is an absolute value of a difference of the half field of view of the optical imaging lens 1 between the first focusing state and the second focusing state.

An air gap between the fifth lens element 50 and the filter 3 along the optical axis I is G5F when the filter 3 is placed between the fifth lens element 50 and the image plane 4; a thickness of the filter 3 along the optical axis I is TF; an air gap between the filter 3 and the image plane 4 along the optical axis I is GFP; and a distance from the image-side surface 52 of the fifth lens element 50 to the image plane 4 along the optical axis I, namely the back focal length is BFL. Therefore, BFL=G5F+TF+GFP.

Furthermore, a focal length of the first lens element 10 is f1; a focal length of the second lens element 20 is f2; a focal length of the third lens element 30 is f3; a focal length of the fourth lens element 40 is f4; a focal length of the fifth lens element 50 is f5; a refractive index of the first lens element 10 is n1; a refractive index of the second lens element 20 is n2; a refractive index of the third lens element 30 is n3; a refractive index of the fourth lens element 40 is n4; a refractive index of the fifth lens element 50 is n5; an Abbe number of the first lens element 10 is υ1; an Abbe number of the second lens element 20 is υ2; an Abbe number of the third lens element 30 is υ3; an Abbe number of the fourth lens element 40 is υ4 and an Abbe number of the fifth lens element 50 is υ5.

First Embodiment

Please refer to FIG. 6 which illustrates the first embodiment of the optical imaging lens 1 of the present invention. Please refer to FIG. 7A for the longitudinal spherical aberration at the first focusing state on the image plane 4 of the first embodiment; please refer to FIG. 7B for the field curvature aberration at the first focusing state on the sagittal direction; please refer to FIG. 7C for the field curvature aberration on the tangential direction; please refer to FIG. 7D for the distortion aberration at the first focusing state; please refer to FIG. 7E for the longitudinal spherical aberration on the image plane 4 at the second focusing state of the first embodiment; please refer to FIG. 7F for the field curvature aberration on the sagittal direction at the second focusing state; please refer to FIG. 7G for the field curvature aberration on the tangential direction at the second focusing state; and please refer to FIG. 7H for the distortion aberration at the second focusing state. The Y axis of the spherical aberration in each embodiment is "field of view" for 1.0. The Y axis of the field curvature aberration and the distortion aberration in each embodiment stands for the "image height" (ImgH), which is 3.500 mm.

The optical imaging lens 1 of the first embodiment is mainly composed of an aperture stop 2, a front lens group 81, a rear lens group 82 and an image plane 4. The aperture stop 2 is provided at the side of the first lens element 10 of the front lens group 81 facing the object side A1. There are five lens elements in total having refracting power, i.e., the first lens element 10, the second lens element 20, the third lens element 30, a fourth lens element 40 and the fifth lens element 50, in the front lens group 81 and in the rear lens group 82. The front lens group 81 includes the first lens element 10, the second lens element 20 and the third lens element 30, and the rear lens group 82 includes the fourth lens element 40 and the fifth lens element 50.

The first lens element 10 has positive refracting power. An optical axis region 13 and a periphery region 14 of the object-side surface 11 of the first lens element 10 are convex. An optical axis region 16 and a periphery region 17 of the image-side surface 12 of the first lens element 10 are concave. Besides, both the object-side surface 11 and the image-side surface 12 of the first lens element 10 are aspherical surfaces, but it is not limited thereto.

The second lens element 20 has negative refracting power. An optical axis region 23 and a periphery region 24 of the object-side surface 21 of the second lens element 20 are convex. An optical axis region 26 of the image-side surface 22 and a periphery region 27 of the image-side surface 22 of the second lens element 20 are concave. Besides, both the object-side surface 21 and the image-side surface 22 of the second lens element 20 are aspherical surfaces, but it is not limited thereto.

The third lens element 30 has positive refracting power. An optical axis region 33 of the object-side surface 31 of the third lens element 30 is convex and a periphery region 34 of the object-side surface 31 of the third lens element 30 is concave. An optical axis region 36 and a periphery region 37 of the image-side surface 32 of the third lens element 30 are convex. Besides, both the object-side surface 31 and the image-side surface 32 of the third lens element 30 are aspherical surfaces, but it is not limited thereto.

The fourth lens element 40 has negative refracting power. An optical axis region 43 of the object-side surface 41 of the fourth lens element 40 is concave and a periphery region 44 of the object-side surface 41 of the fourth lens element 40 is convex. An optical axis region 46 of the image-side surface 42 of the fourth lens element 40 is convex and a periphery region 47 of the image-side surface 42 of the fourth lens element 40 is concave. Besides, both the object-side surface 41 and the image-side surface 42 of the fourth lens element 40 are aspherical surfaces, but it is not limited thereto.

The fifth lens element 50 has negative refracting power. An optical axis region 53 of the object-side surface 51 of the fifth lens element 50 is convex and a periphery region 54 of the object-side surface 51 of the fifth lens element 50 is concave. An optical axis region 56 and a periphery region 57 of the image-side surface 52 of the fifth lens element 50 are concave. Besides, both the object-side surface 51 and the image-side surface 52 of the fifth lens element 50 are aspherical surfaces, but it is not limited thereto.

In the optical imaging lens element 1 from the first lens element 10 to the fifth lens element 50 of the present invention, there are 10 surfaces, such as the object-side surfaces 11/21/31/41/51 and the image-side surfaces 12/22/32/42/52 are aspherical, but it is not limited thereto. If a surface is aspherical, these aspheric coefficients are defined according to the following formula:

$$Z(Y) = \frac{Y^2}{R} \bigg/ \left(1 + \sqrt{1-(1+K)\frac{Y^2}{R^2}}\right) + \sum_{i=1}^{n} a_i \times Y^i$$

In which:
Y represents a vertical distance from a point on the aspherical surface to the optical axis I;
Z represents the depth of an aspherical surface (the perpendicular distance between the point of the aspherical surface at a distance Y from the optical axis I and the tangent plane of the vertex on the optical axis I of the aspherical surface);
R represents the radius of curvature of the lens element surface;
K is a conic constant; and
$a_i$ is the aspheric coefficient of the $i^{th}$ order, and the $a_2$ coefficient in each embodiment is 0.

The optical data of the first embodiment of the optical imaging lens 1 are shown in FIG. 22 while the aspheric surface data are shown in FIG. 23. In the present embodiments of the optical imaging lens, the f-number of the entire optical imaging lens is Fno, EFL is the effective focal length at the first focusing state and EFLA is an effective focal length at the second focusing state, HFOV stands for the half field of view of the entire optical imaging lens 1, and the unit for the image height, the radius of curvature, the thickness and the focal length is in millimeters (mm). In this embodiment, EFL=9.638 mm; EFLA=7.649 mm; Fno=3.070 at the first focusing state; Fno=2.436 at the second focusing state; HFOV=19.975 degrees at the first focusing state; HFOV=20.191 degrees at the second focusing state; the focal length of the front lens group 81=6.180 mm; the focal length of the rear lens group 82=−9.216 mm; TTL=12.330 mm; ImgH=3.500 mm.

Second Embodiment

Figure 8:
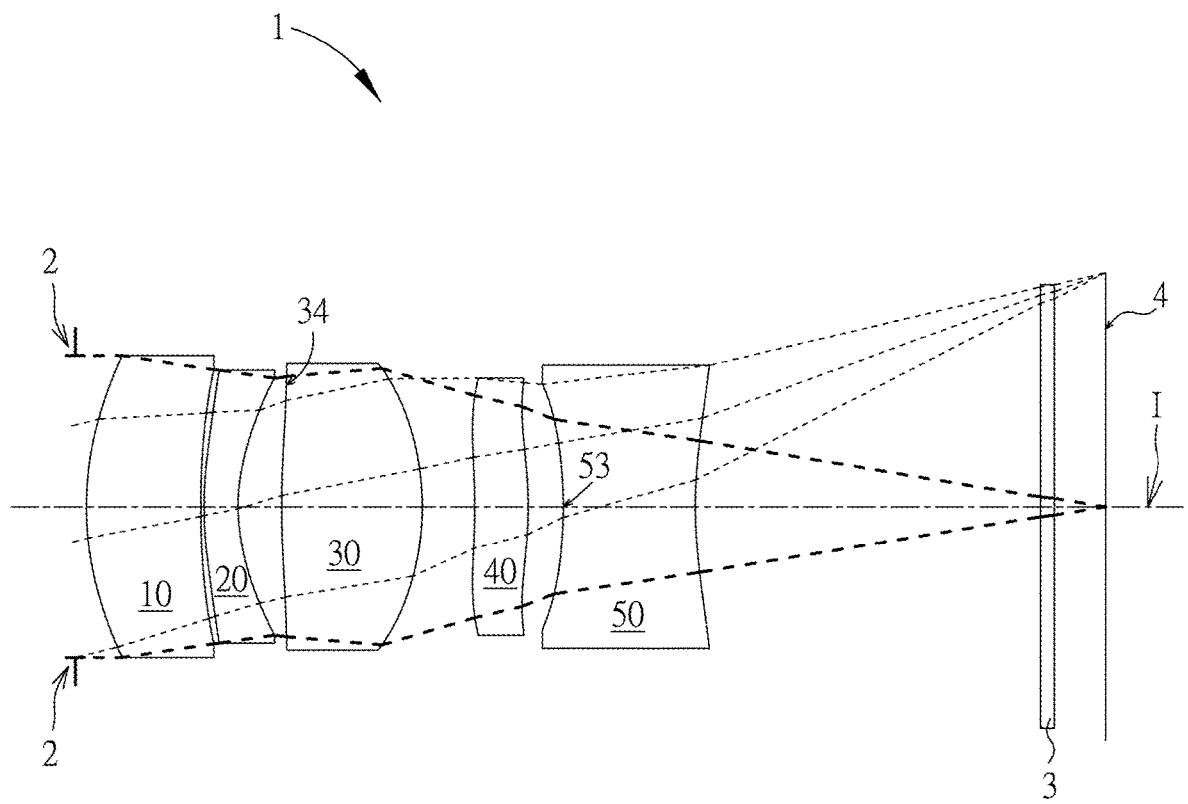
FIG. 8 illustrates a second embodiment of the optical imaging lens of the present invention.

Please refer to FIG. 8 which illustrates the second embodiment of the optical imaging lens 1 of the present invention. It is noted that from the second embodiment to the following embodiments, in order to simplify the figures, only the components different from what the first embodiment has, and the basic lens elements will be labeled in figures. Other components that are the same as what the first embodiment has, such as a convex surface or a concave surface, are omitted in the following embodiments. Please refer to FIG. 9A for the longitudinal spherical aberration on the image plane 4 at the first focusing state of the second embodiment; please refer to FIG. 9B for the field curvature aberration on the sagittal direction at the first focusing state; please refer to FIG. 9C for the field curvature aberration on the tangential direction at the first focusing state; please refer to FIG. 9D for the distortion aberration at the first focusing state; please refer to FIG. 9E for the longitudinal spherical aberration on the image plane 4 at the second focusing state of the first embodiment, please refer to FIG. 9F for the field curvature aberration on the sagittal direction at the second focusing state; please refer to FIG. 9G for the field curvature aberration on the tangential direction at the second focusing state, and please refer to FIG. 9H for the distortion aberration at the second focusing state. The components in this embodiment are similar to those in the first embodiment, but the optical data such as the refracting power, the radius of curvature, the lens element thickness, the aspheric surface or the back focal length in this embodiment are different from the optical data in the first embodiment. Besides, in this embodiment, the periphery region 34 of the object-side surface 31 of the third lens element 30 is convex, the fourth lens element 40 has positive refracting power, and the optical axis region 53 of the object-side surface 51 of the fifth lens element 50 is concave.

The optical data of the second embodiment of the optical imaging lens are shown in FIG. 24 while the aspheric surface data are shown in FIG. 25. In this embodiment, EFL=13.896 mm, EFLA=9.379 mm, Fno=3.070 at the first focusing state, Fno=2.141 at the second focusing state, HFOV=14.025 degrees at the first focusing state, HFOV=13.705 degrees at the second focusing state, the focal length of the front lens group 81=8.015 mm, the focal length of the rear lens group 82=−8.702 mm, TTL=15.253 mm, ImgH=3.500 mm. In particular, the field curvature aberration on the tangential direction at the second focusing state of the optical imaging lens in this embodiment is better than that at the second focusing state of the optical imaging lens in the first embodiment.

Third Embodiment

Figure 10:
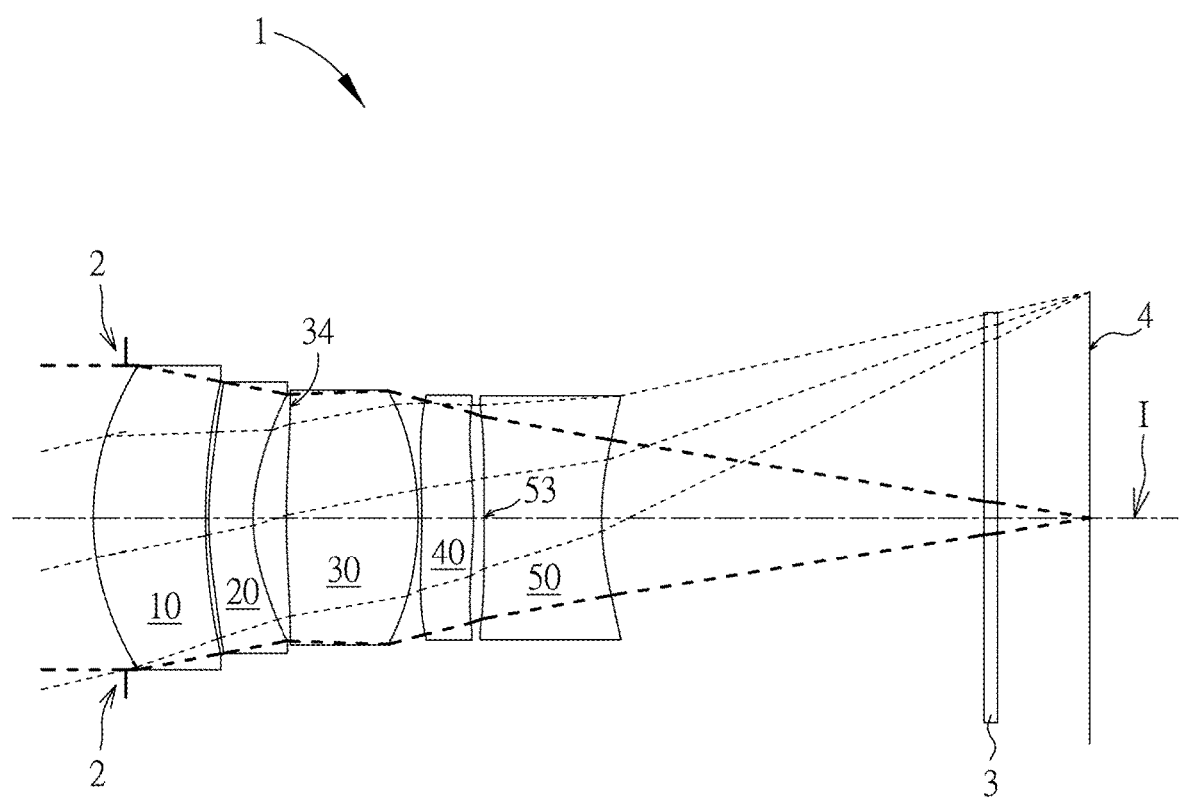
FIG. 10 illustrates a third embodiment of the optical imaging lens of the present invention.

Please refer to FIG. 10 which illustrates the third embodiment of the optical imaging lens 1 of the present invention. Please refer to FIG. 11A for the longitudinal spherical aberration on the image plane 4 at the first focusing state of the third embodiment; please refer to FIG. 11B for the field curvature aberration on the sagittal direction at the first focusing state; please refer to FIG. 11C for the field curvature aberration on the tangential direction at the first focusing state; please refer to FIG. 11D for the distortion aberration at the first focusing state; please refer to FIG. 11E for the longitudinal spherical aberration on the image plane 4 at the second focusing state of the first embodiment; please refer to FIG. 11F for the field curvature aberration on the sagittal direction at the second focusing state; please refer to FIG. 11G for the field curvature aberration on the tangential direction at the second focusing state; please refer to FIG. 11H for the distortion aberration at the second focusing state. The components in this embodiment are similar to those in the first embodiment, but the optical data such as the refracting power, the radius of curvature, the lens element thickness, the aspheric surface or the back focal length in this embodiment are different from the optical data in the first embodiment. Besides, in this embodiment, the periphery region 34 of the object-side surface 31 of the third lens element 30 is convex, the fourth lens element 40 has positive refracting power, and the optical axis region 53 of the object-side surface 51 of the fifth lens element 50 is concave.

The optical data of the third embodiment of the optical imaging lens are shown in FIG. 26 while the aspheric surface data are shown in FIG. 27. In this embodiment, EFL=14.500 mm, EFLA=9.521 mm, Fno=3.070 at the first focusing state, Fno=2.125 at the second focusing state, HFOV=13.379 degrees at the first focusing state, HFOV=12.435 degrees at the second focusing state, the focal length of the front lens group 81=8.973 mm, the focal length of the rear lens group 82=−11.480 mm, TTL=15.455 mm, ImgH=3.500 mm. In particular, the field curvature aberration on the sagittal direction at the first focusing state of the optical imaging lens in this embodiment is better than that at the first focusing state of the optical imaging lens in the first embodiment.

Fourth Embodiment

Figure 12:
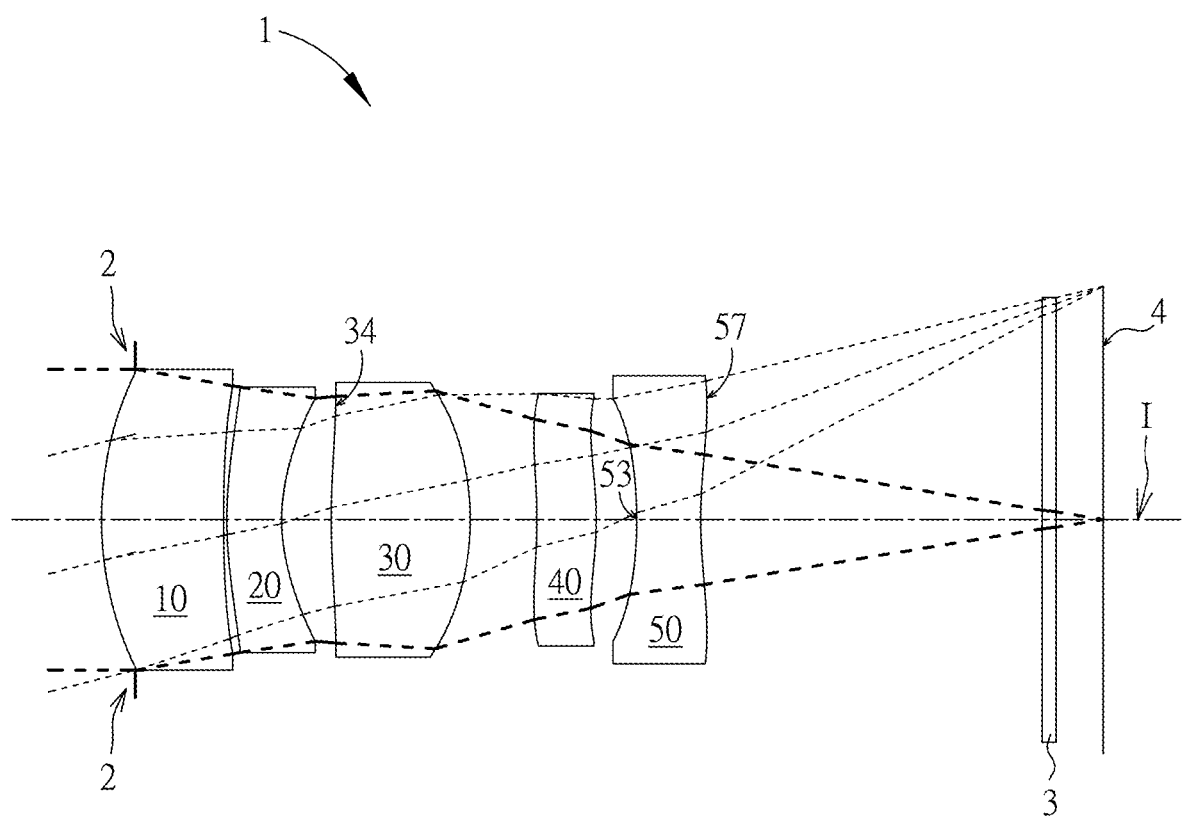
FIG. 12 illustrates a fourth embodiment of the optical imaging lens of the present invention.

Please refer to FIG. 12 which illustrates the fourth embodiment of the optical imaging lens 1 of the present invention. Please refer to FIG. 13A for the longitudinal spherical aberration on the image plane 4 at the first focusing state of the fourth embodiment; please refer to FIG. 13B for the field curvature aberration on the sagittal direction at the first focusing state; please refer to FIG. 13C for the field curvature aberration on the tangential direction at the first focusing state; and please refer to FIG. 13D for the distortion aberration at the first focusing state; please refer to FIG. 13E for the longitudinal spherical aberration on the image plane 4 at the second focusing state of the first embodiment; please refer to FIG. 13F for the field curvature aberration on the sagittal direction at the second focusing state; please refer to FIG. 13G for the field curvature aberration on the tangential direction at the second focusing state; please refer to FIG. 13H for the distortion aberration at the second focusing state. The components in this embodiment are similar to those in the first embodiment, but the optical data such as the refracting power, the radius of curvature, the lens element thickness, the aspheric surface or the back focal length in this embodiment are different from the optical data in the first embodiment. Besides, in this embodiment, the periphery region 34 of the object-side surface 31 of the third lens element 30 is convex, the fourth lens element 40 has positive refracting power, and the optical axis region 53 of the object-side surface 51 of the fifth lens element 50 is concave, and the periphery region 57 of the image-side surface 52 of the fifth lens element is convex.

The optical data of the fourth embodiment of the optical imaging lens are shown in FIG. 28 while the aspheric surface data are shown in FIG. 29. In this embodiment, EFL=13.846 mm, EFLA=9.271 mm, Fno=3.070 at the first focusing state, Fno=2.088 at the second focusing state, HFOV=14.073 degrees at the first focusing state, HFOV=13.611 degrees at the second focusing state, the focal length of the front lens group 81=7.913 mm, the focal length of the rear lens group 82=−8.304 mm, TTL=14.999 mm, ImgH=3.500 mm. In particular, the field curvature aberration on the sagittal direction at the first focusing state of the optical imaging lens in this embodiment is better than that at the first focusing state of the optical imaging lens in the first embodiment.

Fifth Embodiment

Figure 14:
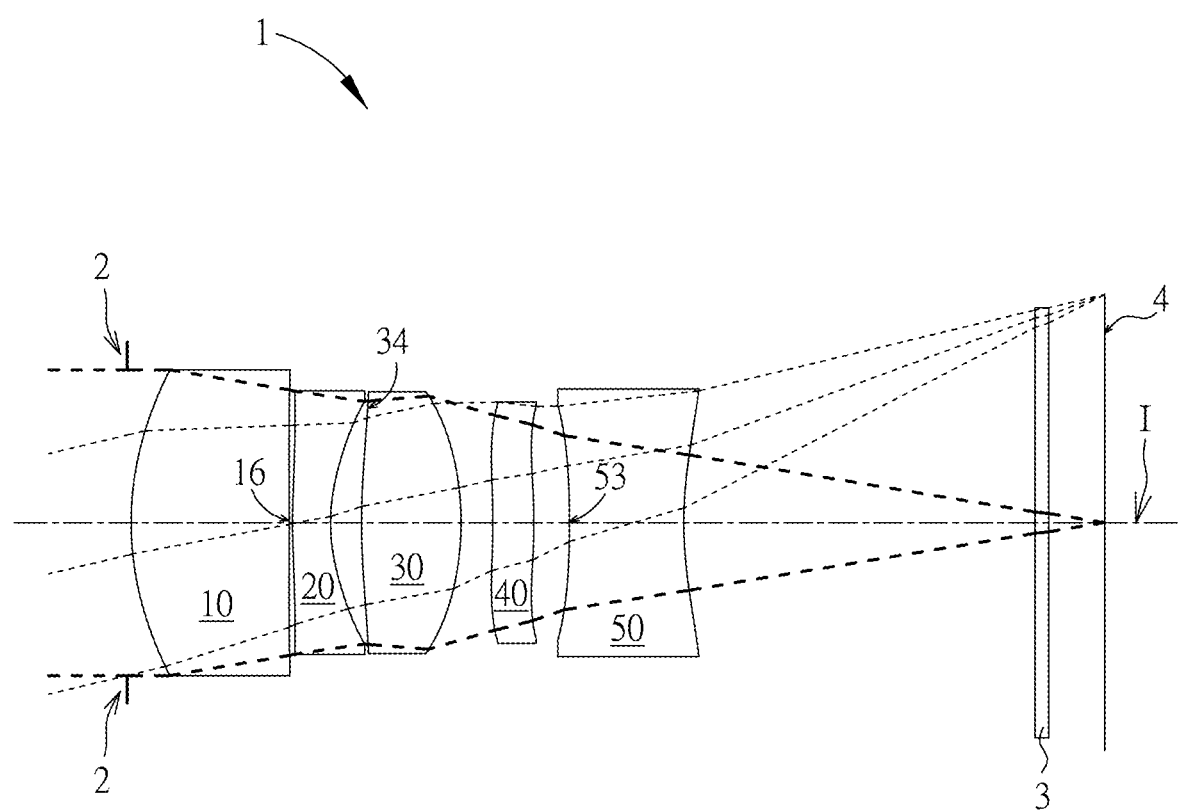
FIG. 14 illustrates a fifth embodiment of the optical imaging lens of the present invention.

Please refer to FIG. 14 which illustrates the fifth embodiment of the optical imaging lens 1 of the present invention. Please refer to FIG. 15A for the longitudinal spherical aberration on the image plane 4 at the first focusing state of the fifth embodiment; please refer to FIG. 15B for the field curvature aberration on the sagittal direction at the first focusing state; please refer to FIG. 15C for the field curvature aberration on the tangential direction at the first focusing state; please refer to FIG. 15D for the distortion aberration at the first focusing state; please refer to FIG. 15E for the longitudinal spherical aberration on the image plane 4 at the second focusing state of the first embodiment; please refer to FIG. 15F for the field curvature aberration on the sagittal direction at the second focusing state, please refer to FIG. 15G for the field curvature aberration on the tangential direction at the second focusing state; please refer to FIG. 15H for the distortion aberration at the second focusing state. The components in this embodiment are similar to those in the first embodiment, but the optical data such as the refracting power, the radius of curvature, the lens element thickness, the aspheric surface or the back focal length in this embodiment are different from the optical data in the first embodiment. Besides, in this embodiment, the optical axis region 16 of the image-side surface 12 of the first lens element 10 is convex, the periphery region 34 of the object-side surface 31 of the third lens element 30 is convex, the fourth lens element 40 has positive refracting power, and the optical axis region 53 of the object-side surface 51 of the fifth lens element 50 is concave.

The optical data of the fifth embodiment of the optical imaging lens are shown in FIG. 30 while the aspheric surface data are shown in FIG. 31. In this embodiment, EFL=14.407 mm, EFLA=9.421 mm, Fno=3.074 at the first focusing state, Fno=2.093 at the second focusing state, HFOV=13.389 degrees at the first focusing state, HFOV=12.657 degrees at the second focusing state, the focal length of the front lens group 81=8.393 mm, the focal length of the rear lens group 82=−9.112 mm, TTL=14.911 mm, ImgH=3.500 mm. In particular, the field curvature aberration on the tangential direction at the second focusing state of the optical imaging lens in this embodiment is better than that at the second focusing state of the optical imaging lens in the first embodiment.

Sixth Embodiment

Figure 16:
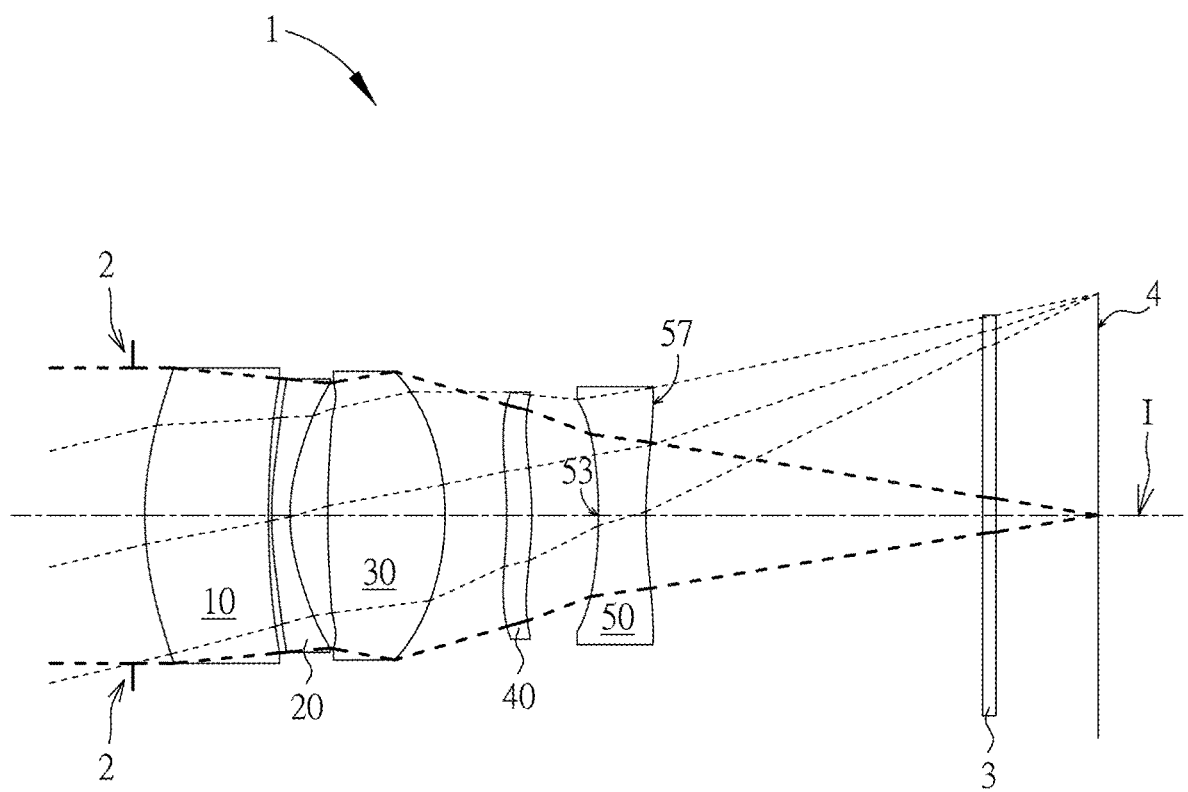
FIG. 16 illustrates a sixth embodiment of the optical imaging lens of the present invention.
Figure 17A:
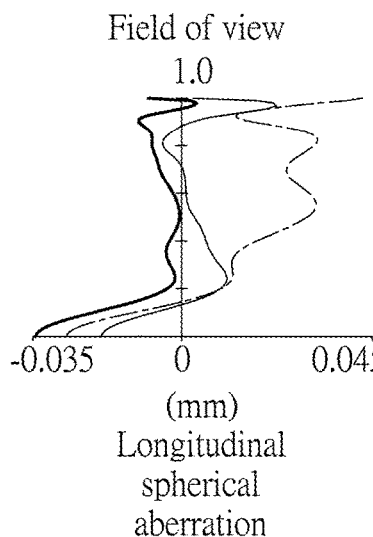
FIG. 17A illustrates the longitudinal spherical aberration on the image plane at the first focusing state of the sixth embodiment.
Figure 17B:
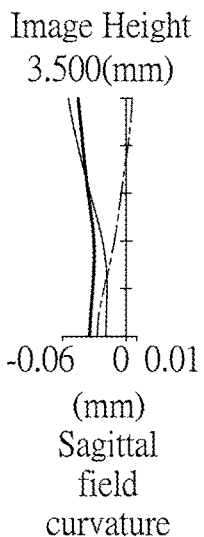
FIG. 17B illustrates the field curvature aberration on the sagittal direction at the first focusing state of the sixth embodiment.
Figure 17C:
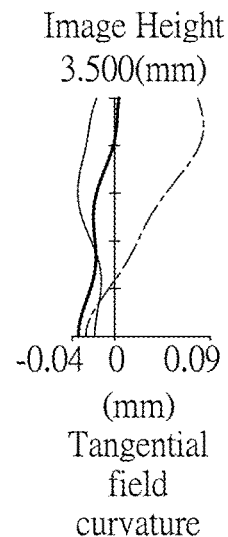
FIG. 17C illustrates the field curvature aberration on the tangential direction at the first focusing state of the sixth embodiment.
Figure 17D:
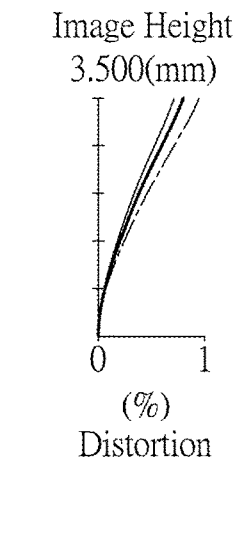
FIG. 17D illustrates the distortion aberration at the first focusing state of the sixth embodiment.
Figure 17E:
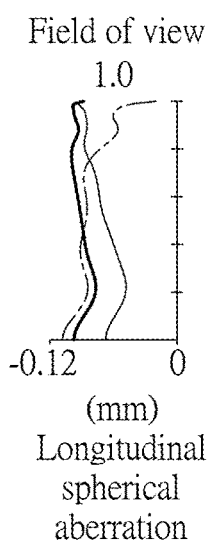
FIG. 17E illustrates the longitudinal spherical aberration on the image plane at the second focusing state of the sixth embodiment.
Figure 17F:
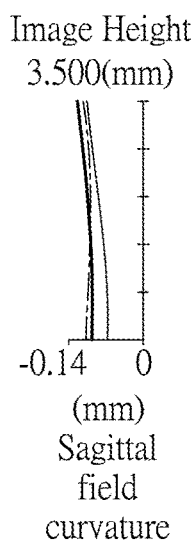
FIG. 17F illustrates the field curvature aberration on the sagittal direction at the second focusing state of the sixth embodiment.
Figure 17G:
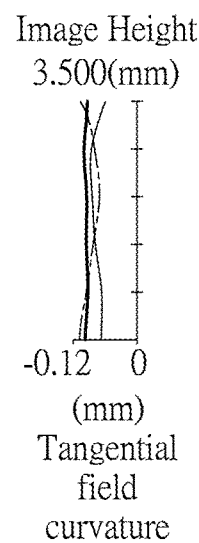
FIG. 17G illustrates the field curvature aberration on the tangential direction at the second focusing state of the sixth embodiment.
Figure 17H:
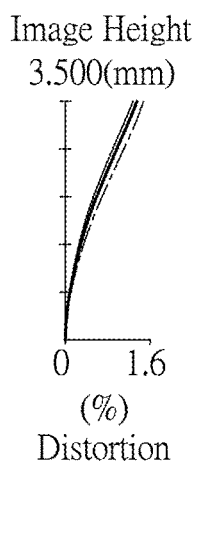
FIG. 17H illustrates the distortion aberration at the second focusing state of the sixth embodiment.

Please refer to FIG. 16 which illustrates the sixth embodiment of the optical imaging lens 1 of the present invention. Please refer to FIG. 17A for the longitudinal spherical aberration on the image plane 4 at the first focusing state of the sixth embodiment; please refer to FIG. 17B for the field curvature aberration on the sagittal direction at the first focusing state; please refer to FIG. 17C for the field curvature aberration on the tangential direction at the first focusing state; please refer to FIG. 17D for the distortion aberration at the first focusing state; please refer to FIG. 17E for the longitudinal spherical aberration on the image plane 4 at the second focusing state of the first embodiment; please refer to FIG. 17F for the field curvature aberration on the sagittal direction at the second focusing state, please refer to FIG. 17G for the field curvature aberration on the tangential direction at the second focusing state; please refer to FIG. 17H for the distortion aberration at the second focusing state. The components in this embodiment are similar to those in the first embodiment, but the optical data such as the refracting power, the radius of curvature, the lens element thickness, the aspheric surface or the back focal length in this embodiment are different from the optical data in the first embodiment. Besides, in this embodiment, the fourth lens element 40 has positive refracting power, and the optical axis region 53 of the object-side surface 51 of the fifth lens element 50 is concave, and the periphery region 57 of the image-side surface 52 of the fifth lens element is convex.

The optical data of the sixth embodiment of the optical imaging lens are shown in FIG. 32 while the aspheric surface data are shown in FIG. 33. In this embodiment, EFL=14.314 mm, EFLA=9.794 mm, Fno=3.070 at the first focusing state, Fno=2.206 at the second focusing state, HFOV=13.597 degrees at the first focusing state, HFOV=13.179 degrees at the second focusing state, the focal length of the front lens group 81=8.097 mm, the focal length of the rear lens group 82=−9.154 mm, TTL=15.041 mm, ImgH=3.500 mm.

Seventh Embodiment

Figure 18:
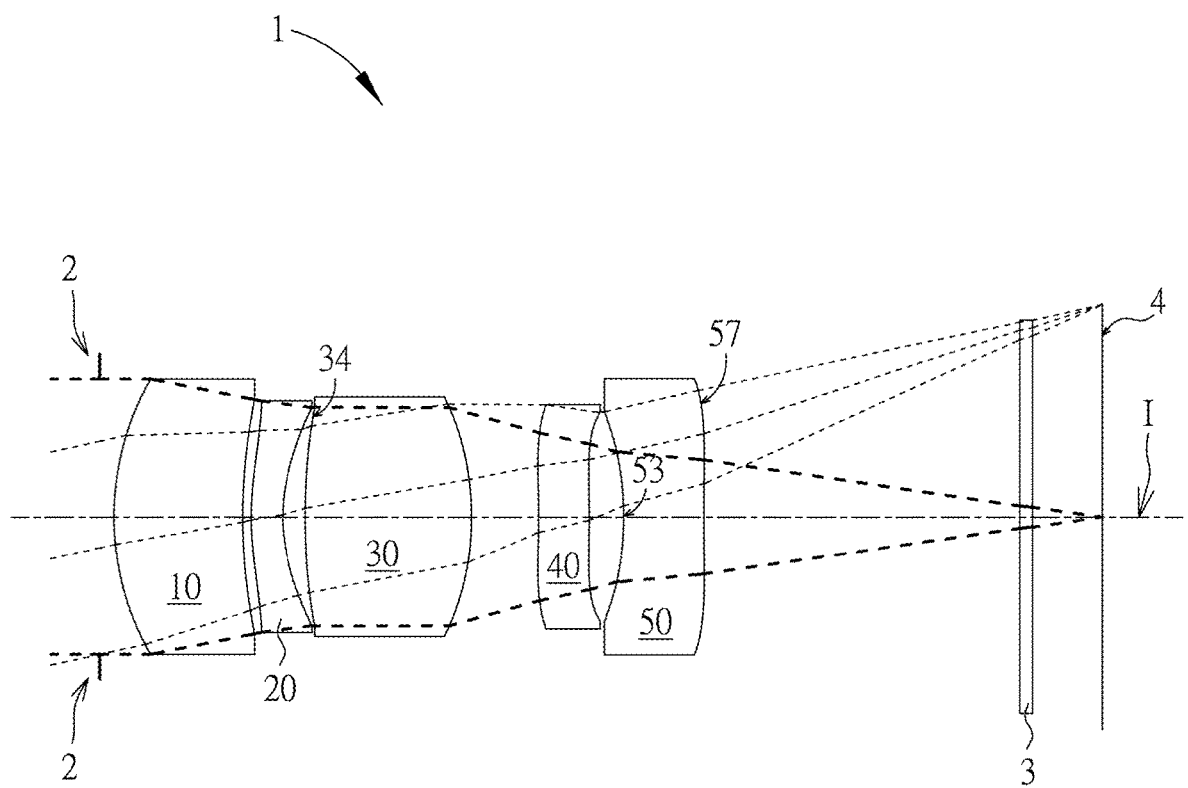
FIG. 18 illustrates a seventh embodiment of the optical imaging lens of the present invention.

Please refer to FIG. 18 which illustrates the seventh embodiment of the optical imaging lens 1 of the present invention. Please refer to FIG. 19A for the longitudinal spherical aberration on the image plane 4 at the first focusing state of the seventh embodiment; please refer to FIG. 19B for the field curvature aberration on the sagittal direction at the first focusing state; please refer to FIG. 19C for the field curvature aberration on the tangential direction at the first focusing state; please refer to FIG. 19D for the distortion aberration at the first focusing state; please refer to FIG. 19E for the longitudinal spherical aberration on the image plane 4 at the second focusing state of the first embodiment; please refer to FIG. 19F for the field curvature aberration on the sagittal direction at the second focusing state, please refer to FIG. 19G for the field curvature aberration on the tangential direction at the second focusing state; please refer to FIG. 19H for the distortion aberration at the second focusing state. The components in this embodiment are similar to those in the first embodiment, but the optical data such as the refracting power, the radius of curvature, the lens element thickness, the aspheric surface or the back focal length in this embodiment are different from the optical data in the first embodiment. Besides, in this embodiment, the periphery region 34 of the object-side surface 31 of the third lens element 30 is convex, the optical axis region 53 of the object-side surface 51 of the fifth lens element 50 is concave, and the periphery region 57 of the image-side surface 52 of the fifth lens element is convex.

The optical data of the seventh embodiment of the optical imaging lens are shown in FIG. 34 while the aspheric surface data are shown in FIG. 35. In this embodiment, EFL=15.792 mm, EFLA=10.185 mm, Fno=3.476 at the first focusing state, Fno=2.242 at the second focusing state, HFOV=12.425 degrees at the first focusing state, HFOV=12.019 degrees at the second focusing state, the focal length of the front lens group 81=8.298 mm, the focal length of the rear lens group 82=−8.148 mm, TTL=16.291 mm, ImgH=3.500 mm.

Eighth Embodiment

Figure 20:
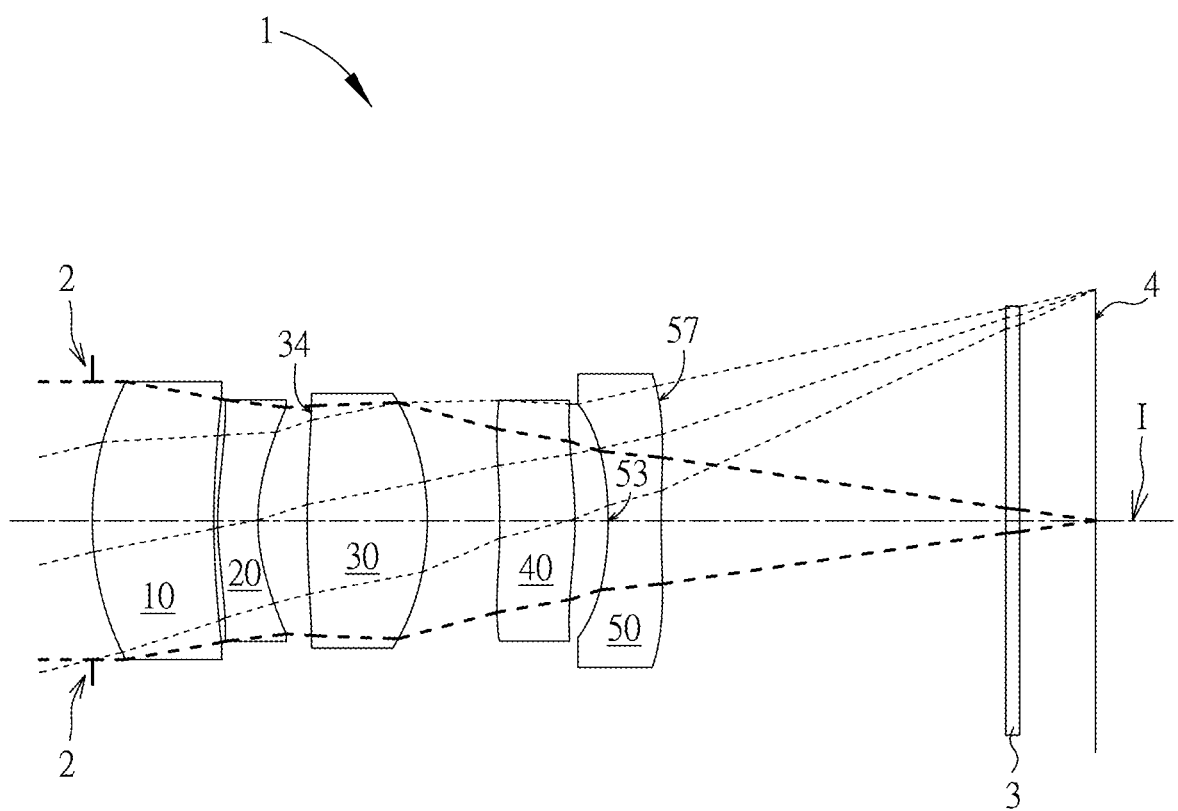
FIG. 20 illustrates an eighth embodiment of the optical imaging lens of the present invention.

Please refer to FIG. 20 which illustrates the eighth embodiment of the optical imaging lens 1 of the present invention. Please refer to FIG. 21A for the longitudinal spherical aberration on the image plane 4 at the first focusing state of the eighth embodiment; please refer to FIG. 21B for the field curvature aberration on the sagittal direction at the first focusing state; please refer to FIG. 21C for the field curvature aberration on the tangential direction at the first focusing state; please refer to FIG. 21D for the distortion aberration at the first focusing state; please refer to FIG. 21E for the longitudinal spherical aberration on the image plane 4 at the second focusing state of the first embodiment; please refer to FIG. 21F for the field curvature aberration on the sagittal direction at the second focusing state, please refer to FIG. 21G for the field curvature aberration on the tangential direction at the second focusing state; please refer to FIG. 21H for the distortion aberration at the second focusing state. The components in this embodiment are similar to those in the first embodiment, but the optical data such as the refracting power, the radius of curvature, the lens element thickness, the aspheric surface or the back focal length in this embodiment are different from the optical data in the first embodiment. Besides, in this embodiment, the periphery region 34 of the object-side surface 31 of the third lens element 30 is convex, the fourth lens element 40 has positive refracting power, and the optical axis region 53 of the object-side surface 51 of the fifth lens element 50 is concave, and the periphery region 57 of the image-side surface 52 of the fifth lens element is convex.

The optical data of the eighth embodiment of the optical imaging lens are shown in FIG. 36 while the aspheric surface data are shown in FIG. 37. In this embodiment, EFL=14.395 mm, EFLA=9.785 mm, Fno=3.423 at the first focusing state, Fno=2.327 at the second focusing state, HFOV=13.652 degrees at the first focusing state, HFOV=13.225 degrees at the second focusing state, the focal length of the front lens group 81=8.063 mm, the focal length of the rear lens group 82=−8.950 mm, TTL=15.167 mm, ImgH=3.500 mm. In particular, the distortion aberration at the first focusing state of the optical imaging lens in this embodiment is better than that at the first focusing state of the optical imaging lens in the first embodiment.

Some important ratios at the first focusing state or at the second focusing state in each embodiment are respectively shown in FIG. 38, in FIG. 39, in FIG. 40 and in FIG. 41.

Each embodiment of the present invention provides an optical imaging lens of five lens elements which has a small size, has a focusing function, has excellent imaging quality, has good optical performance and is technically possible. For example, the satisfaction of the design of the following lens surface shape or refracting power configuration may effectively optimize the imaging quality of the optical imaging lens 1. Furthermore, the present invention has the corresponding advantages:

1. When the aperture stop 2 is disposed at the side of the first lens element 10 facing the object side A1, the first lens element 10 has positive refracting power, the optical axis region 23 of the object-side surface 21 of the second lens element 20 is convex or the periphery region 24 of the object-side surface 21 of the second lens element 20 is convex, it is able to effectively converge the incident rays coming from different angles while improving the marginal aberration on the image plane 4. When the object is moved from the infinite distance to the macro focusing state or moved from the macro focusing state to the infinite distance, the rear lens group 82 may enable the optical imaging lens 1 to correspondingly form a first focusing state and a second focusing state by moving along the optical axis I to adjust the focus. If the effective focal length of the two focusing states satisfies the ratio limitations of EFL/EFLA≥1.200, it is possible to maintain good imaging quality while focusing in addition to keeping the TTL of the optical imaging lens 1 fixed. Wherein, the preferable range of EFL/EFLA is 1.200≤EFL/EFLA≤1.700.

2. When the first lens element 10 has positive refracting power, and the optical axis region 23 of the object-side surface 21 of the second lens element 20 is convex or the periphery region 24 of the object-side surface 21 of the second lens element 20 is convex, it is able to effectively converge the incident rays coming from different angles. To go with that the fifth lens element 50 has negative refracting power, it is possible to improve the marginal aberration on the image plane 4. When the object is moved from the infinite distance to the macro focusing state or moved from the macro focusing state to the infinite distance, the rear lens group 82 may enable the optical imaging lens 1 to correspondingly form a first focusing state and a second focusing state by moving along the optical axis I to adjust the focus. If the effective focal length of the two focusing states satisfies the ratio limitations of EFL/EFLA≥1.200, it is possible to maintain good imaging quality while focusing in addition to keeping the TTL of the optical imaging lens 1 fixed. Wherein, the preferable range of EFL/EFLA is 1.200≤EFL/EFLA≤1.700. If it further satisfies one of: (a) the third lens element 30 has positive refracting power or (b) the optical axis region 33 of the object-side surface 31 of the third lens element 30 is convex, it is further conducive to converge the imaging rays and to maintain the TTL of the optical imaging lens 1 while keeping good imaging quality.

3. In addition to 1 and 2, if the optical imaging lens 1 has the front lens group 81 with positive refracting power, and the rear lens group 82 with negative refracting power, different objects of different object distances may have good imaging quality by converging the imaging rays by the front lens group 81 to go with the rear lens group 82 of negative refracting power to move along the optical axis I.

4. The optical imaging lens 1 correspondingly forms a first focusing state and a second focusing state to have an effective focused image and good imaging quality when the object is moved from the infinite distance to a distance 40 mm to 55 mm in front of the optical imaging lens 1.

5. The optical imaging lens 1 may have a focused state while keeping a fixed volume by the movement of the rear lens group 82.

5. If the focal length of each lens element of the present invention satisfies the following ranges or the ratio relationships, it may preferably improve the distortion aberration or the field curvature aberration of the imaging system:

(f1+f2)/f5≤0.000, and the preferable range is −0.750≤(f1+f2)/f5≤0.000;

(f2+f3)/f4≥−0.200, and the preferable range is −0.200≤(f2+f3)/f4≤0.100;

f2/f3≥−2.200, and the preferable range is −2.200≤f2/f3≤−0.900;

f2/f4≤0.500, and the preferable range is −0.600≤f2/f4≤0.500;

(f2+f3)/f5≤0.750, and the preferable range is −0.100≤(f2+f3)/f5≤0.750.

7. When the materials of the lens elements satisfy the following limitations, the chromatic aberration and spherical aberration generated during the focusing process at different object distances may be effectively suppressed, so that the optical imaging lens 1 has overall good resolution at different focusing states.

υ2+υ+υ4≤120.000, and the preferable range is 75.000≤υ2+υ+υ4≤120.000;

υ1+υ3+υ≥145.000, and the preferable range is 145.000≤υ1+υ+υ≤185.000;

(υ1+υ)/(υ2+υ4)≥1.700, and the preferable range is 1.700≤(υ1+υ)/(υ2+υ4)≤2.600.

8. When the first focusing state and the second focusing state of the optical imaging lens 1 satisfy the following ratio limitations, it may ensure the optical imaging lens 1 to maintain good imaging quality in both focusing states:

ΔHFOV*TTL/ALT≤2.200 degrees, and the preferable range is 0.400 degrees≤ΔHFOV*TTL/ALT≤2.200 degrees;

ALT/ΔHFOV≥5.000 mm/degrees, and the preferable range is 6.750 mm/degrees≤ALT/ΔHFOV≤30.000 mm/degrees;

ALT/AG≥1.900, and the preferable range is 1.900≤ALT/ΔG≤4.200.

9. To ensure imaging quality, reduce the lens volume and take the assembly fabrication into consideration, the lens thickness and the air gaps should be properly reduced or kept in a certain range. The embodiments of the present invention may have better arrangements when the numerical limitations of the following conditions are satisfied:

TTL/(T1+G45)≤8.100, and the preferable range is 4.500≤TTL/(T1+G45)≤8.100;

AAG/T1≤2.600, and the preferable range is 0.450≤AAG/T1≤2.600;

T3/(G12+T2)≥2.400, and the preferable range is 2.400≤T3/(G12+T2)≤5.800;

TL/BFL≤3.100, and the preferable range is 0.950≤TL/BFL≤3.100;

TTL/(T3+T5)≤5.800, and the preferable range is 3.300≤TTL/(T3+T5)≤5.800;

(G23+T4+G45)/T1≤1.300, and the preferable range is 0.650≤(G23+T4+G45)/T1≤1.300;

(T3+G34+T4)/(G12+G23)≥5.000, and the preferable range is 5.000≤(T3+G34+T4)/(G12+G23)≤15.000;

T3/T4≥1.600, and the preferable range is 1.600≤T3/T4≤5.000; TL/(G34+T5)≤4.600, and the preferable range is 1.850≤TL/(G34+T5)≤4.600;

(AAG+BFL)/ALT≤1.900, and the preferable range is 0.950≤(AAG+BFL)/ALT≤1.900;

(T1+T3+T5)/(G12+T2+G23)≥3.000, and the preferable range is 3.000≤(T1+T3+T5)/(G12+T2+G23)≤6.500;

ALT/Tmax≥2.600, and the preferable range is 2.600≤ALT/Tmax≤3.800;

TTL/Tavg≤15.000, and the preferable range is 9.500≤TTL/Tavg≤15.000;

Tmax/Tmin≥2.500, and the preferable range is 2.500≤Tmax/Tmin≤7.000.

Any arbitrary combination of the parameters of the embodiments can be selected additionally to increase the lens limitation so as to facilitate the design of the same structure of the present invention.

In the light of the unpredictability of the optical imaging lens, the satisfactions of above conditional formulas suggest that the optical imaging lens which has improved imaging quality, a reduced volume or better assembly yield under the configurations of the present invention to improve the drawbacks of prior art. The use of plastic material for the lens elements of the embodiments of the present invention may further reduce the weight of the lens and save the cost.

The ranges including a maximum value or a minimum value of the combinations or ratio relationships of the aforementioned optical parameters in the embodiments of the present invention are all implementable and all belong to the scope disclosed by the invention.

The contents in the embodiments of the invention include but are not limited to a focal length, a thickness of a lens element, an Abbe number, or other optical parameters. For example, in the embodiments of the invention, an optical parameter A and an optical parameter B are disclosed, wherein the ranges of the optical parameters, comparative relation between the optical parameters, and the range of a conditional expression covered by a plurality of embodiments are specifically explained as follows:

(1) The ranges of the optical parameters are, for example, $\alpha_2 \leq A \leq \alpha_1$ or $\beta_2 \leq B \leq \beta_1$, where $\alpha_1$ is a maximum value of the optical parameter A among the plurality of embodiments, $\alpha_2$ is a minimum value of the optical parameter A among the plurality of embodiments, $\beta_1$ is a maximum value of the optical parameter B among the plurality of embodiments, and $\beta_2$ is a minimum value of the optical parameter B among the plurality of embodiments.

(2) The comparative relation between the optical parameters is that A is greater than B or A is less than B, for example.

(3) The range of a conditional expression covered by a plurality of embodiments is in detail a combination relation or proportional relation obtained by a possible operation of a plurality of optical parameters in each same embodiment. The relation is defined as E, and E is, for example, A+B or A−B or A/B or A*B or $(A*B)^{1/2}$, and E satisfies a conditional expression E≤$\gamma_1$ or E≥$\gamma_2$ or $\gamma_2$≤E≤$\gamma_1$, where each of $\gamma_1$ and $\gamma_2$ is a value obtained by an operation of the optical parameter A and the optical parameter B in a same embodiment, $\gamma_1$ is a maximum value among the plurality of the embodiments, and $\gamma_2$ is a minimum value among the plurality of the embodiments.

The ranges of the aforementioned optical parameters, the aforementioned comparative relations between the optical parameters, and a maximum value, a minimum value, and the numerical range between the maximum value and the minimum value of the aforementioned conditional expressions are all implementable and all belong to the scope disclosed by the invention. The aforementioned description is for exemplary explanation, but the invention is not limited thereto.

The embodiments of the invention are all implementable. In addition, a combination of partial features in a same embodiment can be selected, and the combination of partial features can achieve the unexpected result of the invention with respect to the prior art. The combination of partial features includes but is not limited to the surface shape of a lens element, a refracting power, a conditional expression or the like, or a combination thereof. The description of the embodiments is for explaining the specific embodiments of the principles of the invention, but the invention is not limited thereto. Specifically, the embodiments and the drawings are for exemplifying, but the invention is not limited thereto.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens, from an object side to an image side in order along an optical axis comprising: an aperture stop, a front lens group, and a rear lens group, lens elements in the front lens group and in the rear lens group each having an object-side surface facing toward the object side and allowing imaging rays to pass through as well as an image-side surface facing toward the image side and allowing the imaging rays to pass through, the front lens group comprising at least two lens elements,
a first lens element of the front lens group being arranged to be a lens element in a first order from the object side,
the first lens element having positive refracting power,
a second lens element of the front lens group being arranged to be a lens element in a second order from the object side,
an optical axis region of the object-side surface of the second lens element being convex, or a periphery region of the object-side surface of the second lens element being convex,
the rear lens group comprising at least one lens element, and
a fifth lens element of the rear lens group being arranged to be a lens element in a first order from the image side,
wherein lens elements of the optical imaging lens are only five lens elements described above, the rear lens group enables the optical imaging lens to form a first focusing state and a second focusing state by moving along the optical axis, EFL is an effective focal length of the first focusing state, and EFLA is an effective focal length of the second focusing state to satisfy EFL/EFLA≥1.200.

2. The optical imaging lens of claim 1, wherein $\upsilon 2$ is an Abbe number of the second lens element, $\upsilon 3$ is an Abbe number of a third lens element, and $\upsilon 4$ is an Abbe number of a fourth lens element disposed between the third lens element and the fifth lens element, and the optical imaging lens satisfies the relationship: $\upsilon 2+\upsilon 3+\upsilon 4$≤120.000.

3. The optical imaging lens of claim 1, wherein TTL is a distance from the object-side surface of the first lens element to an image plane along the optical axis, T1 is a thickness of the first lens element along the optical axis and G45 is an air gap between a fourth lens element which is disposed between the third lens element and the fifth lens element and the fifth lens element along the optical axis, and the optical imaging lens satisfies the relationship: TTL/(T1+G45) ≤8.100.

4. The optical imaging lens of claim 1, wherein AAG is a sum of four air gaps from the first lens element to the fifth lens element along the optical axis and T1 is a thickness of the first lens element along the optical axis, and the optical imaging lens satisfies the relationship: AAG/T1≤2.600.

5. The optical imaging lens of claim 1, wherein ΔHFOV is an absolute value of a difference of a half field of view of the optical imaging lens between the first focusing state and the second focusing state, TTL is a distance from the object-side surface of the first lens element to an image plane along the optical axis and ALT is a sum of thicknesses of the five lens elements from the first lens element to the fifth lens element along the optical axis, and the optical imaging lens satisfies the relationship: ΔHFOV*TTL/ALT≤2.200 degrees.

6. The optical imaging lens of claim 1, wherein T2 is a thickness of the second lens element along the optical axis, T3 is a thickness of a third lens element along the optical axis and G12 is an air gap between the first lens element and the second lens element along the optical axis, and the optical imaging lens satisfies the relationship: T3/(G12+T2) ≥2.400.

7. The optical imaging lens of claim 1, wherein TL is a distance from the object-side surface of the first lens element to the image-side surface of the fifth lens element along the optical axis and BFL is a distance from the image-side surface of the fifth lens element to an image plane along the optical axis, and the optical imaging lens satisfies the relationship: TL/BFL≤3.100.

8. An optical imaging lens, from an object side to an image side in order along an optical axis comprising: a front lens group and a rear lens group, lens elements in the front lens group and in the rear lens group each having an object-side surface facing toward the object side and allowing imaging rays to pass through as well as an image-side surface facing toward the image side and allowing the imaging rays to pass through, the front lens group comprising at least three lens elements,
a first lens element of the front lens group being arranged to be a lens element in a first order from the object side, the first lens element having positive refracting power,
a second lens element of the front lens group being arranged to be a lens element in a second order from the object side,
an optical axis region of the object-side surface of the second lens element being convex, or a periphery region of the object-side surface of the second lens element being convex,
a third lens element of the front lens group being arranged to be a lens element in a third order from the object side,
the third lens element having positive refracting power,
the rear lens group comprising at least one lens element,
a fifth lens element of the rear lens group being arranged to be a lens element in a first order from the image side, and
the fifth lens element having negative refracting power,
wherein lens elements of the optical imaging lens are only five lens elements described above, the rear lens group enables the optical imaging lens to form a first focusing state and a second focusing state by moving along the optical axis, EFL is an effective focal length of the first focusing state, and EFLA is an effective focal length of the second focusing state to satisfy EFL/EFLA≥1.200.

9. The optical imaging lens of claim 8, wherein υ1 is an Abbe number of the first lens element, υ3 is an Abbe number of the third lens element, and υ5 is an Abbe number of the fifth lens element, and the optical imaging lens satisfies the relationship: υ1+υ3+υ5≥145.000.

10. The optical imaging lens of claim 8, wherein TTL is a distance from the object-side surface of the first lens element to an image plane along the optical axis, T3 is a thickness of the third lens element along the optical axis and T5 is a thickness of the fifth lens element along the optical axis, and the optical imaging lens satisfies the relationship: TTL/(T3+T5)≤5.800.

11. The optical imaging lens of claim 8, wherein T1 is a thickness of the first lens element along the optical axis, T4 is a thickness of a fourth lens element disposed between the third lens element and the fifth lens element along the optical axis, G23 is an air gap between the second lens element and the third lens element along the optical axis and G45 is an air gap between the fourth lens element and the fifth lens element along the optical axis, and the optical imaging lens satisfies the relationship: (G23+T4+G45)/T1≤1.300.

12. The optical imaging lens of claim 8, wherein ALT is a sum of thicknesses of the five lens elements from the first lens element to the fifth lens element along the optical axis and ΔHFOV is an absolute value of a difference of a half field of view of the optical imaging lens between the first focusing state and the second focusing state, and the optical imaging lens satisfies the relationship: ALT/ΔHFOV≥5.000 mm/degrees.

13. The optical imaging lens of claim 8, wherein T3 is a thickness of the third lens element along the optical axis, T4 is a thickness of a fourth lens element disposed between the third lens element and the fifth lens element along the optical axis, G12 is an air gap between the first lens element and the second lens element along the optical axis, G23 is an air gap between the second lens element and the third lens element along the optical axis and G34 is an air gap between the third lens element and the fourth lens element along the optical axis, and the optical imaging lens satisfies the relationship: (T3+G34+T4)/(G12+G23)≥5.000.

14. The optical imaging lens of claim 8, wherein T3 is a thickness of the third lens element along the optical axis and T4 is a thickness of a fourth lens element disposed between the third lens element and the fifth lens element along the optical axis, and the optical imaging lens satisfies the relationship: T3/T4≥1.600.

15. An optical imaging lens, from an object side to an image side in order along an optical axis comprising: a front lens group and a rear lens group, lens elements in the front lens group and in the rear lens group each having an object-side surface facing toward the object side and allowing imaging rays to pass through as well as an image-side surface facing toward the image side and allowing the imaging rays to pass through,
the front lens group comprising at least three lens elements,
a first lens element of the front lens group being arranged to be a lens element in a first order from the object side,
the first lens element having positive refracting power,
a second lens element of the front lens group being arranged to be a lens element in a second order from the object side,
an optical axis region of the object-side surface of the second lens element being convex, or a periphery region of the object-side surface of the second lens element being convex,
a third lens element of the front lens group being arranged to be a lens element in a third order from the object side,
an optical axis region of the object-side surface of the third lens element being convex,
the rear lens group comprising at least one lens element,
a fifth lens element of the rear lens group being arranged to be a lens element in a first order from the image side, and
the fifth lens element having negative refracting power,
wherein lens elements of the optical imaging lens are only five lens elements described above, the rear lens group enables the optical imaging lens to form a first focusing state and a second focusing state by moving along the optical axis, EFL is an effective focal length of the first focusing state, and EFLA is an effective focal length of the second focusing state to satisfy EFL/EFLA≥1.200.

16. The optical imaging lens of claim 15, wherein υ1 is an Abbe number of the first lens element, υ2 is an Abbe number of the second lens element, υ4 is an Abbe number of a fourth lens element disposed between the third lens element and the fifth lens element, and υ5 is an Abbe number of the fifth lens element, and the optical imaging lens satisfies the relationship: (υ1+υ5)/(υ2+υ4)≥1.700.

17. The optical imaging lens of claim 15, wherein TL is a distance from the object-side surface of the first lens element to the image-side surface of the fifth lens element along the optical axis, T5 is a thickness of a fifth lens element along the optical axis and G34 is an air gap between the third lens element and a fourth lens element disposed between the third lens element and the fifth lens element along the optical axis, and the optical imaging lens satisfies the relationship: TL/(G34+T5)≤4.600.

18. The optical imaging lens of claim 15, wherein AAG is a sum of four air gaps from the first lens element to the fifth lens element along the optical axis, BFL is a distance from the image-side surface of the fifth lens element to an image plane along the optical axis and ALT is a sum of thicknesses of the five lens elements from the first lens element to the fifth lens element along the optical axis, and the optical imaging lens satisfies the relationship: (AAG+BFL)/ALT≤1.900.

19. The optical imaging lens of claim 15, wherein ΔG is an absolute value of a difference of a sum of four air gaps of the optical imaging lens between the first focusing state and the second focusing state and ALT is a sum of thicknesses of the five lens elements from the first lens element to the fifth lens element along the optical axis, and the optical imaging lens satisfies the relationship: ALT/ΔG≥1.900.

20. The optical imaging lens of claim 15, wherein T1 is a thickness of the first lens element along the optical axis, T2 is a thickness of the second lens element along the optical axis, T3 is a thickness of the third lens element along the optical axis, T5 is a thickness of a fifth lens element along the optical axis, G12 is an air gap between the first lens element and the second lens element along the optical axis and G23 is an air gap between the second lens element and the third lens element along the optical axis, and the optical imaging lens satisfies the relationship: (T1+T3+T5)/(G12+T2+G23)≥3.000.

* * * * *